United States Patent
Call

(10) Patent No.: US 11,088,995 B2
(45) Date of Patent: *Aug. 10, 2021

(54) CLIENT/SERVER SECURITY BY AN INTERMEDIARY RENDERING MODIFIED IN-MEMORY OBJECTS

(71) Applicant: Shape Security, Inc., Mountain View, CA (US)

(72) Inventor: Justin Call, Santa Clara, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/024,621

(22) Filed: Jun. 29, 2018

(65) Prior Publication Data

US 2018/0309729 A1    Oct. 25, 2018

Related U.S. Application Data

(63) Continuation of application No. 14/929,019, filed on Oct. 30, 2015, now Pat. No. 10,027,628, which is a (Continued)

(51) Int. Cl.
*G06F 21/00* (2013.01)
*G06F 21/52* (2013.01)
(Continued)

(52) U.S. Cl.
CPC .......... *H04L 63/04* (2013.01); *G06F 9/45529* (2013.01); *H04L 29/06972* (2013.01);
(Continued)

(58) Field of Classification Search
CPC . H04L 63/04; H04L 63/1466; H04L 63/0281; H04L 29/06972; H04L 67/42; G06F 9/45529
See application file for complete search history.

(56) References Cited

U.S. PATENT DOCUMENTS 6,938,170 B1    8/2005 Kraft
8,170,020 B2    5/2012 Oliver
(Continued)

FOREIGN PATENT DOCUMENTS

GB           2443093 A      4/2008
WO     WO2000/72119      11/2000
(Continued)

OTHER PUBLICATIONS

Hanqian Wu; Yi Ding; Chuck Winer; Li Yao; "Network security for virtual machine in cloud computing"; 5th International Conference on Computer Sciences and Convergence Information Technology; Year: 2010 | Conference Paper | Publisher: IEEE; pp. 18-21 (Year: 2010).*

(Continued)

*Primary Examiner* — Shewaye Gelagay
*Assistant Examiner* — Courtney D Fields
(74) *Attorney, Agent, or Firm* — Troutman Pepper Hamilton Sanders LLP (Rochester)

(57) ABSTRACT

In an embodiment, a method comprises intercepting, from a server computer, a first set of instructions that define one or more objects and one or more operations that are based, at least in part, on the one or more objects; generating, in memory, one or more data structures that correspond to the one or more objects; performing the one or more operations on the one or more data structures; updating the one or more data structures, in response to performing the one or more operations, to produce one or more updated data structures; rendering a second set of instructions, which when executed by a remote client computer cause the remote client computer to generate the updated data structures in memory on the remote client computer, wherein the second set of instructions are different than the first set of instructions;

(Continued)

sending the second set of instructions to the remote client computer.

20 Claims, 9 Drawing Sheets

Related U.S. Application Data continuation of application No. 14/099,437, filed on Dec. 6, 2013, now Pat. No. 9,270,647.

(51) Int. Cl.
    *H04L 29/06*     (2006.01)
    *G06F 9/455*     (2018.01)

(52) U.S. Cl.
    CPC ...... *H04L 63/0281* (2013.01); *H04L 63/1466* (2013.01); *H04L 67/42* (2013.01)

(56) References Cited

U.S. PATENT DOCUMENTS

| | | |
|---|---|---|
| 8,601,064 B1 | 12/2013 | Liao |
| 8,806,627 B1 | 8/2014 | Aharoni |
| 8,869,281 B2 | 10/2014 | Call |
| 8,892,687 B1 | 11/2014 | Call |
| 8,904,279 B1 | 12/2014 | Bougon |
| 8,954,583 B1 | 2/2015 | Zhou |
| 9,075,990 B1 | 7/2015 | Yang |
| 9,225,729 B1 | 12/2015 | Moen |
| 9,225,737 B2 | 12/2015 | Call |
| 9,241,004 B1 | 1/2016 | April |
| 9,275,222 B2 | 3/2016 | Yang |
| 9,294,502 B1 | 3/2016 | Benishti |
| 9,356,954 B2 | 5/2016 | Zhou |
| 9,609,006 B2 | 3/2017 | Call |
| 2002/0016918 A1 | 2/2002 | Tucker |
| 2002/0188631 A1 | 12/2002 | Tiemann |
| 2003/0005129 A1 | 1/2003 | Scheinkman |
| 2003/0159063 A1 | 8/2003 | Apfelbaum |
| 2005/0010764 A1 | 1/2005 | Collet |
| 2005/0278626 A1 | 12/2005 | Malik |
| 2006/0212932 A1 | 9/2006 | Patrick |
| 2007/0074227 A1* | 3/2007 | Naidu ............... G06F 9/54 719/330 |
| 2007/0245027 A1 | 10/2007 | Ghosh |
| 2008/0250310 A1 | 10/2008 | Chen |
| 2009/0007243 A1 | 1/2009 | Boodaei |
| 2009/0077383 A1 | 3/2009 | de Monseignat |
| 2009/0144829 A1 | 6/2009 | Grigsby |
| 2009/0193513 A1 | 7/2009 | Agarwal |
| 2009/0204820 A1 | 8/2009 | Brandenburg |
| 2009/0216882 A1 | 8/2009 | Britton |
| 2009/0249310 A1 | 10/2009 | Meijer |
| 2009/0282062 A1 | 11/2009 | Husic |
| 2009/0292791 A1 | 11/2009 | Livshits |
| 2010/0100927 A1 | 4/2010 | Bhola |
| 2010/0180346 A1 | 7/2010 | Nicolson |
| 2010/0235636 A1 | 9/2010 | Cohen |
| 2010/0240449 A1 | 9/2010 | Corem |
| 2010/0257354 A1 | 10/2010 | Johnston |
| 2010/0262780 A1 | 10/2010 | Mahan |
| 2011/0015917 A1 | 1/2011 | Wang |
| 2011/0107077 A1 | 5/2011 | Henderson |
| 2011/0154473 A1* | 6/2011 | Anderson ............. G06F 21/64 726/11 |
| 2011/0178973 A1 | 7/2011 | Lopez |
| 2011/0225234 A1 | 9/2011 | Amit |
| 2011/0255689 A1 | 10/2011 | Bolotov |
| 2011/0296391 A1 | 12/2011 | Gass |
| 2012/0022942 A1 | 1/2012 | Holloway |
| 2012/0124372 A1 | 5/2012 | Dilley |
| 2012/0198528 A1 | 8/2012 | Baumhof |
| 2012/0254727 A1 | 10/2012 | Jain |
| 2013/0031037 A1 | 1/2013 | Brandt |
| 2013/0227397 A1* | 8/2013 | Tvorun ............... G06F 17/227 715/235 |
| 2013/0232578 A1 | 9/2013 | Chevallier-Mames |
| 2014/0053059 A1* | 2/2014 | Weber ............... G06F 9/45529 715/234 |
| 2014/0281535 A1 | 9/2014 | Kane |
| 2014/0282872 A1 | 9/2014 | Hansen |
| 2014/0283069 A1 | 9/2014 | Call |
| 2014/0289830 A1 | 9/2014 | Lemaster |
| 2014/0379902 A1 | 12/2014 | Wan |
| 2015/0163201 A1 | 6/2015 | Call |
| 2015/0341385 A1 | 11/2015 | Sivan |
| 2016/0080515 A1 | 3/2016 | Kruglick |
| 2016/0142438 A1 | 5/2016 | Pastore |
| 2016/0182537 A1 | 6/2016 | Tatourian |
| 2016/0191351 A1 | 6/2016 | Smith |
| 2016/0212101 A1 | 7/2016 | Reshadi |
| 2016/0342793 A1 | 11/2016 | Hidayat |
| 2016/0359901 A1 | 12/2016 | Yang |
| 2017/0012960 A1 | 1/2017 | Idika |
| 2017/0063923 A1 | 3/2017 | Yang |
| 2017/0118241 A1 | 4/2017 | Call |
| 2017/0201540 A1 | 7/2017 | Call |
| 2018/0144133 A1 | 5/2018 | Hoover |
| 2018/0152436 A1 | 5/2018 | Yang |
| 2018/0212993 A1 | 7/2018 | Call |
| 2018/0248913 A1 | 8/2018 | Yang |
| 2018/0309729 A1 | 10/2018 | Call |
| 2019/0140835 A1 | 5/2019 | Moen |
| 2019/0243951 A1 | 8/2019 | Hansen |
| 2019/0373018 A1 | 12/2019 | Yang |

FOREIGN PATENT DOCUMENTS

| | | | |
|---|---|---|---|
| WO | WO2002/093369 | 11/2002 | |
| WO | WO2010/046314 | 4/2010 | |
| WO | WO2013091709 | 6/2013 | |
| WO | WO-2016130178 A1 * | 8/2016 | ............. H04L 67/10 |
| WO | WO2017007936 | 1/2017 | |
| WO | WO2017/040453 | 3/2017 | |
| WO | PCT/US2016/049357 | 3/2018 | |

OTHER PUBLICATIONS

CTNF, mailed on Feb. 17, 2017, re: Siying Yang, U.S. Appl. No. 15/235,909, filed Aug. 12, 2016.
NOA, mailed on Feb. 16, 2017, re: Justin D. Call, U.S. Appl. No. 14/822,287, filed Aug. 10, 2015.
NOA, mailed on Mar. 2, 2017, re: Justin D. Call, U.S. Appl. No. 14/930,198, filed Nov. 2, 2015.
CTNF, mailed on Nov. 30, 2016, re: Siying Yang, U.S. Appl. No. 14/841,013, filed Aug. 31, 2015.
NOA, mailed on Mar. 10, 2017, re: Roger S. Hoover, U.S. Appl. No. 14/470,082, filed Aug. 27, 2014.
CTNF, mailed on Mar. 10, 2017, re: Justin D. Call, U.S. Appl. No. 14/922,436, filed Oct. 26, 2015.
NOA, mailed on Mar. 16, 2017, re: Siying Yang, U.S. Appl. No. 15/052,951, filed Feb. 25, 2016.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
NOA, mailed on Jun. 19, 2015, re: Justin Call, U.S. Appl. No. 14/055,583, filed Oct. 16, 2013.
CTNF, mailed on Dec. 24, 2013, re: Justin Call, U.S. Appl. No. 14/055,646, filed Oct. 16, 2013.
CTFR, mailed on May 27, 2014, re: Justin Call, U.S. Appl. No. 14/055,646, filed Oct. 16, 2013.
NOA, mailed on Aug. 12, 2014, re: Justin Call, U.S. Appl. No. 14/055,646, filed Oct. 16, 2013.
NOA, mailed on Sep. 4, 2014, re: Justin Call, U.S. Appl. No. 14/055,646, filed Oct. 16, 2013.
CTFR, mailed on Apr. 9, 2015, re: Justin Call, U.S. Appl. No. 14/055,704, filed Oct. 16, 2013.

(56) References Cited

OTHER PUBLICATIONS

CTNF, mailed on Dec. 4, 2014, re: Justin Call, U.S. Appl. No. 14/055,704, filed Oct. 16, 2013.
CTNF, mailed on Dec. 30, 2013, re: Justin Call, U.S. Appl. No. 14/055,704, filed Oct. 16, 2013.
CTFR, mailed on Apr. 22, 2014, re: Justin Call, U.S. Appl. No. 14/055,704, filed Oct. 16, 2013.
CTFR, mailed on Sep. 25, 2015, re: Marc Hansen, U.S. Appl. No. 14/055,714, filed Oct. 16, 2013.
CTNF, mailed on Mar. 16, 2015, re: Marc Hansen, U.S. Appl. No. 14/055,714, filed Oct. 16, 2013.
NOA, mailed on Jan. 13, 2016, re: Marc Hansen, U.S. Appl. No. 14/055,714, filed Oct. 16, 2013.
NOA, mailed on Jan. 25, 2016, re: Justin Call, U.S. Appl. No. 14/099,437, filed Dec. 6, 2013.
NOA, mailed on Aug. 3, 2015, re: Justin Call, U.S. Appl. No. 14/099,437, filed Dec. 6, 2013.
CTNF, mailed on Jun. 10, 2014, re: Xiaoming Zhou, U.S. Appl. No. 14/159,374, filed Jan. 20, 2014.
NOA, mailed on Sep. 25, 2014, re: Xiaoming Zhou, U.S. Appl. No. 14/159,374, filed Jan. 20, 2014.
NOA, mailed on Nov. 10, 2014, re: Xiaoming Zhou, U.S. Appl. No. 14/159,374, filed Jan. 20, 2014.
CTNF, mailed on Apr. 10, 2014, re: Oscar Steele, U.S. Appl. No. 14/160,105, filed Jan. 21, 2014.
NOA, mailed on Oct. 17, 2014, re: Oscar Steele, U.S. Appl. No. 14/160,105, filed Jan. 21, 2014.
NOA, mailed on Aug. 19, 2015, re: Daniel Moen, U.S. Appl. No. 14/160,107, filed Jan. 21, 2014.
CTFR, mailed on Nov. 6, 2014, re: Justin Call, U.S. Appl. No. 14/160,126, filed Jan. 21, 2014.
CTFR, mailed on May 23, 2014, re: Justin Call, U.S. Appl. No. 14/160,126, filed Jan. 21, 2014.
NOA, mailed on Feb. 20, 2015, re: Justin Call, U.S. Appl. No. 14/160,126, filed Jan. 21, 2014.
NOA, mailed on May 5, 2014, re: Justin Call, U.S. Appl. No. 14/175,923, filed Feb. 7, 2014.
NOA, mailed on Sep. 11, 2014, re: Justin Call, U.S. Appl. No. 14/175,923, filed Feb. 7, 2014.
NOA, mailed on Oct. 15, 2014, re: Justin Call, U.S. Appl. No. 14/175,923, filed Feb. 7, 2014.
CTNF, mailed on Jan. 20, 2016, re: Shishir K. Ramam, U.S. Appl. No. 14/259,869, filed Apr. 23, 2014.
NOA, mailed on Jun. 21, 2016, re: Shishir K. Ramam, U.S. Appl. No. 14/259,869, filed Apr. 23, 2014.
CTFR, mailed on Apr. 20, 2016, re: Xinran Wang, U.S. Appl. No. 14/286,324, filed May 23, 2014.
CTFR, mailed on Aug. 31, 2015, re: Xinran Wang, U.S. Appl. No. 14/286,324, filed May 23, 2014.
CTFR, mailed on Dec. 2, 2015, re: Xinran Wang, U.S. Appl. No. 14/286,733, filed May 23, 2014.
CTNF, mailed on May 27, 2015, re: Xinran Wang, U.S. Appl. No. 14/286,733, filed May 23, 2014.
CTFR, mailed on Jan. 23, 2015, re: Xinran Wang, U.S. Appl. No. 14/286,733, filed May 23, 2014.
CTNF, mailed on Jul. 14, 2014, re: Xinran Wang, U.S. Appl. No. 14/286,733, filed May 23, 2014.
NOA, mailed on May 4, 2016, re: Xinran Wang, U.S. Appl. No. 14/286,733, filed May 23, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
CTNF, mailed on Oct. 9, 2014, re: Siying Yang, U.S. Appl. No. 14/321,172, filed Jul. 1, 2014.
NOA, mailed on Mar. 30, 2015, re: Siying Yang, U.S. Appl. No. 14/321,172, filed Jul. 1, 2014.
NOA, mailed on Oct. 2, 2016, re: Siying Yang, U.S. Appl. No. 14/329,718, filed Jul. 11, 2014.
NOA, mailed on Aug. 15, 2016, re: Siying Yang, U.S. Appl. No. 14/329,718, filed Jul. 11, 2014.
CTFR, mailed on May 6, 2016, re: Siying Yang, U.S. Appl. No. 14/329,718, filed Jul. 11, 2014.
CTNF, mailed on Feb. 3, 2016, re: Siying Yang, U.S. Appl. No. 14/329,718, filed Jul. 11, 2014.
CTFR, mailed on Feb. 20, 2015, re: Siying Yang, U.S. Appl. No. 14/329,718, filed Jul. 11, 2014.
CTNF, mailed on Oct. 30, 2014, re: Siying Yang, U.S. Appl. No. 14/329,718, filed Jul. 11, 2014.
NOA, mailed on Sep. 15, 2015, re: Siying Yang, U.S. Appl. No. 14/329,718, filed Jul. 11, 2014.
NOA, mailed on Nov. 3, 2016, re: Siying Yang, U.S. Appl. No. 14/329,718, filed Jul. 11, 2014.
NOA, mailed on Jan. 18, 2017, re: Siying Yang, U.S. Appl. No. 14/329,718, filed Jul. 11, 2014.
CTNF, mailed on Sep. 30, 2014, re: Siying Yang, U.S. Appl. No. 14/338,207, filed Jul. 22, 2014.
NOA, mailed on Nov. 7, 2014, re: Siying Yang, U.S. Appl. No. 14/338,207, filed Jul. 22, 2014.
NOA, mailed on Jan. 6, 2015, re: Siying Yang, U.S. Appl. No. 14/338,207, filed Jul. 22, 2014.
CTNF, mailed on Jun. 24, 2016, re: Roger Hoover, U.S. Appl. No. 14/470,082, filed Aug. 27, 2014.
CTNF, mailed on Aug. 28, 2015, re: Roger Hoover, U.S. Appl. No. 14/470,082, filed Aug. 27, 2014.
CTNF, mailed on Dec. 1, 2016, re: Oscar Steele, U.S. Appl. No. 14/481,663, filed Sep. 9, 2014.
NOA, mailed on Apr. 27, 2016, re: Siying Yang, U.S. Appl. No. 14/481,835, filed Sep. 9, 2014.
CTNF, mailed on Oct. 28, 2015, re: Siying Yang, U.S. Appl. No. 14/481,835, filed Sep. 9, 2014.
NOA, mailed on May 24, 2016, re: Siying Yang, U.S. Appl. No. 14/481,835, filed Sep. 9, 2014.
NOA, mailed on Jul. 25, 2016, re: Siying Yang, U.S. Appl. No. 14/481,835, filed Sep. 9, 2014.
CTNF, mailed on Apr. 8, 2016, re: Ariya Hidayat, U.S. Appl. No. 14/481,867, filed Sep. 9, 2014.
CTNF, mailed on Sep. 6, 2016, re: Ariya Hidayat, U.S. Appl. No. 14/481,867, filed Sep. 9, 2014.
NOA, mailed on Dec. 16, 2016, re: Ariya Hidayat, U.S. Appl. No. 14/481,867, filed Sep. 9, 2014.
CTNF, mailed on Jan. 2, 2015, re: Timothy Peacock, U.S. Appl. No. 14/503,346, filed Sep. 30, 2014.
NOA, mailed on Apr. 10, 2015, re: Timothy Peacock, U.S. Appl. No. 14/503,346, filed Sep. 30, 2014.
CTNF, mailed on Dec. 14, 2015, re: Oscar Steele, U.S. Appl. No. 14/542,994, filed Nov. 17, 2014.
NOA, mailed on Mar. 28, 2016, re: Oscar Steele, U.S. Appl. No. 14/542,994, filed Nov. 17, 2014.
CTFR, mailed on Dec. 28, 2016, re: Siying Yang, U.S. Appl. No. 14/570,466, filed Dec. 15, 2014.
CTNF, mailed on Apr. 21, 2016, re: Siying Yang, U.S. Appl. No. 14/570,466, filed Dec. 15, 2014.
CTNF, mailed on Apr. 22, 2016, re: Justin Call, U.S. Appl. No. 14/602,038, filed Jan. 21, 2015.
NOA, mailed on Sep. 19, 2016, re: Justin Call, U.S. Appl. No. 14/602,038, filed Jan. 21, 2015.
NOA, mailed on Mar. 16, 2016, re: Xiaoming Zhou, U.S. Appl. No. 14/618,389, filed Feb. 10, 2015.
NOA, mailed on Apr. 12, 2016, re: Xiaoming Zhou, U.S. Appl. No. 14/618,389, filed Feb. 10, 2015.
CTFR, mailed on Jan. 15, 2016, re: Xiaoming Zhou, U.S. Appl. No. 14/618,389, filed Feb. 10, 2015.
CTNF, mailed on Oct. 5, 2015, re: Xiaoming Zhou, U.S. Appl. No. 14/618,389, filed Feb. 10, 2015.
CTFR, mailed on Mar. 30, 2016, re: Siying Yang, U.S. Appl. No. 14/679,596, filed Apr. 6, 2015.
CTNF, mailed on Nov. 4, 2015, re: Siying Yang, U.S. Appl. No. 14/679,596, filed Apr. 6, 2015.
NOA, mailed on Jul. 18, 2016, re: Siying Yang, U.S. Appl. No. 14/679,596, filed Apr. 6, 2015.

(56) References Cited

OTHER PUBLICATIONS

CTFR, mailed on May 19, 2016, re: Justin Call, U.S. Appl. No. 14/702,140, filed May 1, 2015.
CTNF, mailed on Oct. 23, 2015, re: Justin Call, U.S. Appl. No. 14/702,140, filed May 1, 2015.
CTFR, mailed on Jul. 15, 2016, re: Justin Call, U.S. Appl. No. 14/702,349, filed May 1, 2015.
CTNF, mailed on Feb. 1, 2016, re: Justin Call, U.S. Appl. No. 14/702,349, filed May 1, 2015.
NOA, mailed on Oct. 24, 2016, re: Justin Call, U.S. Appl. No. 14/702,349, filed May 5, 2015.
CTNF, mailed on Oct. 7, 2016, re: Justin Call, U.S. Appl. No. 14/713,493, filed May 5, 2015.
CTNF, mailed on Nov. 10, 2016, re: Nwokedi Idika, U.S. Appl. No. 14/728,621, filed Jun. 2, 2015.
NOA, mailed on Oct. 23, 2015, re: Siying Yang, U.S. Appl. No. 14/790,738, filed Jul. 2, 2015.
CTNF, mailed on Jul. 18, 2016, re: Justin Call, U.S. Appl. No. 14/822,287, filed Aug. 10, 2015.
CTNF, mailed on Oct. 19, 2016, re: Justin Call, U.S. Appl. No. 14/929,019, filed Oct. 30, 2015.
NOA, mailed on Nov. 9, 2016, re: Justin Call, U.S. Appl. No. 14/930,198, filed Nov. 2, 2015.
CTNF, mailed on Jul. 21, 2016, re: Justin Call, U.S. Appl. No. 14/930,198, filed Nov. 2, 2015.
CTFR, mailed on Sep. 9, 2016, re: Siying Yang, U.S. Appl. No. 14/968,460, filed Dec. 14, 2015.
CTNF, mailed on Apr. 8, 2016, re: Siying Yang, U.S. Appl. No. 14/968,460, filed Dec. 14, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTNF, mailed on Oct. 7, 2016, re: Siying Yang, U.S. Appl. No. 15/052,951, filed Feb. 25, 2016.
NOA, mailed on Mar. 29, 2017, re: Siying Yang, U.S. Appl. No. 15/052,951, filed Feb. 25, 2016.
NOA, mailed on Apr. 11, 2017, re: Siying Yang, U.S. Appl. No. 15/052,951, filed Feb. 25, 2016.
CTNF, mailed on Dec. 16, 2016, re: Marc Hansen, U.S. Appl. No. 15/148,139, filed May 6, 2016.
CTFR, mailed on Feb. 6, 2017, re: Xiaoming Zhou, U.S. Appl. No. 15/157,704, filed May 18, 2016.
CTNF, mailed on Oct. 6, 2016, re: Xiaoming Zhou, U.S. Appl. No. 15/157,704, filed May 18, 2016.
NOA, mailed on Mar. 7, 2017, re: Xiaoming Zhou, U.S. Appl. No. 15/157,704, filed May 18, 2016.
CTNF, mailed on May 22, 2017, re: Siying Yang, U.S. Appl. No. 14/329,718, filed Jul. 11, 2014.
NOA, mailed on May 22, 2017, re: Roger S. Hoover, U.S. Appl. No. 14/713,493, filed May 15, 2015.
NOA, mailed on Jun. 7, 2017, re: Call, et al., U.S. Appl. No. 14/930,198, filed Jun. 7, 2017.
CTNF, mailed on Jun. 2, 2017, re: Ariya Hidayat, U.S. Appl. No. 15/224,978, filed Aug. 1, 2016.
NOA, mailed on Jun. 30, 2017, re: Roger S. Hoover, U.S. Appl. No. 14/713,493, filed May 15, 2015.
CTNF, mailed on May 25, 2017, re: Daniel G. Moen, U.S. Appl. No. 14/980,231, filed Dec. 28, 2015.
CTFR, mailed on Jun. 6, 2017, re: Siying Yang, U.S. Appl. No. 15/235,909, filed Aug. 12, 2016.
NOA, mailed on Jun. 20, 2017, re: Roger S. Hoover, U.S. Appl. No. 14/470,082, filed Aug. 27, 2014.
NOA, mailed on Jul. 13, 2017, re: Xinran Wang, U.S. Appl. No. 14/286,324, filed May 23, 2014.
NOA, mailed on Jun. 27, 2017, re: Siying Yang, U.S. Appl. No. 14/841,013, filed Aug. 31, 2015.
NOA, mailed on Jun. 20, 2017, re: Siying Yang, U.S. Appl. No. 15/052,951, filed Feb. 25, 2016.
CTNF, mailed on Jul. 28, 2017, re: Xinran Wang, U.S. Appl. No. 15/230,540, filed Aug. 8, 2016.
NOA, mailed on Aug. 4, 2017, re: Justin Call, U.S. Appl. No. 14/929,019, filed Oct. 30, 2015.
CTFR, mailed on Aug. 14, 2017, re: Marc R. Hansen, U.S. Appl. No. 15/148,139, filed May 6, 2016.
CTFR, mailed on Aug. 11, 2017, re: Oscar H. Steele III, U.S. Appl. No. 15/224,985, filed Aug. 1, 2016.
NOA, mailed on Aug. 29, 2017, re: Siying Yang, U.S. Appl. No. 15/052,951, filed Feb. 25, 2016.
NOA, mailed on Aug. 29, 2017, re: Roger S. Hoover, U.S. Appl. No. 14/713,493, filed May 5, 2015.
CTNF, mailed on Aug. 30, 2017, re: Justin D. Call, U.S. Appl. No. 15/470,715, filed Mar. 27, 2017.
CTNF, mailed on Aug. 4, 2017, re: Siying Yang, U.S. Appl. No. 15/242,062, filed Aug. 19, 2016.
CTFR, mailed on Oct. 5, 2017, re: Justin D. Call, U.S. Appl. No. 147/922,436, filed Oct. 26, 2015.
NOA, mailed on Oct. 11, 2017, re: James D. Call, U.S. Appl. No. 14/822,287, filed Aug. 10, 2015.
NOA, mailed on Oct. 18, 2017, re: Roger S. Hoover, U.S. Appl. No. 14/470,082, filed Aug. 27, 2014.
NOA, mailed on Oct. 10, 2017, re: Roger S. Hoover, U.S. Appl. No. 14/713,493, filed May 15, 2015.
CTNF, mailed on Oct. 6, 2017, re: Wesley Hales, U.S. Appl. No. 14/849,459, filed Sep. 9, 2015.
CTNF, mailed on Nov. 13, 2017, re: Nwokedi Idike, U.S. Appl. No. 14/728,596, filed Jun. 2, 2015.
NOA, mailed on Jan. 9, 2018, re: Justin D. Call, U.S. Appl. No. 15/470,715, filed Mar. 27, 2017.
NOA, mailed on Jan. 16, 2018, re: Justin D. Call, U.S. Appl. No. 14/822,287, filed Aug. 10, 2015.
CTNF, mailed on Feb. 7, 2017, re: Daniel G. Moen, U.S. Appl. No. 14/980,231, filed Dec. 28, 2015.
NOA, mailed on Mar. 14, 2018, re: Justin Call, U.S. Appl. No. 14/929,019, filed Oct. 30, 2015.
CTNF, mailed on May 3, 2018, re: Marc R. Hansen, U.S. Appl. No. 15/148,139, filed May 6, 2016.
CTFR, mailed on Apr. 9, 2018, re: Siying Yang, U.S. Appl. No. 15/242,062, filed Aug. 19, 2016.
CTFR, mailed on May 10, 2018, re: Nwokedi Idika, U.S. Appl. No. 14/728,596, filed Jun. 2, 2016.
CTNF, mailed on Jun. 6, 2018, re: Oscar H. Steele, III, U.S. Appl. No. 15/224,985, filed Aug. 1, 2016.
CTNF, mailed on Jul. 12, 2018, re: Justin D. Call, U.S. Appl. No. 14/922,436, filed Oct. 26, 2015.
NOA, mailed on Aug. 13, 2018, re: Daniel G. Moen, U.S. Appl. No. 14/980,231, filed Dec. 28, 2015.
EP App. No. 1473229.3, Intention to Grant, EP, Call et al., dated May 23, 2017.
Examination Report No. 1 for Standard Patent Application, App. No. 2014237025, AU, Call, Justin D, dated Sep. 25, 2014.
In-the-wire authentication: Protecting client-side critical data fields in secure network transactions, Jan. 14, 2009.
WebShield: Enabling various web defense techniques without client side modifications, Feb. 6, 2011.
Detecting and Preventing Drive-By Download Attack via Participative Monitoring of the Web, Jul. 23, 2013.
Design and Implementation of a Distributed Virtual Machine for Networked Computers, 1999.
On-the-fly web content integrity check boosts users' confidence, Nov. 1, 2002.
International Preliminary Report on Patentability, dated Jun. 16, 2016, PCT/US14/68133.
International Search Report, dated Apr. 7, 2015, PCT/US14/68133.
International Search Report, dated Jul. 28, 2015, PCT/US15/31361.
International Search Report, dated Apr. 9, 2015, PCT/US15/12072.
International Preliminary Report on Patentability, dated Nov. 30, 2015, PCT/US15/12072.
International Search Report, dated Jan. 21, 2015, PCT/US14/23635.
International Search Report, dated Dec. 30, 2016, PCT/US16/53392.

(56) References Cited

OTHER PUBLICATIONS

International Search Report, dated Nov. 21, 2016, PCT/US16/49357.
International Search Report, dated Oct. 11, 2016, PCT/US16/41337.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
Collection of articles regarding HTML DOM, all available online as of Dec. 21, 2014, 7 pages, Dec. 21, 2014.
NOA, mailed on Sep. 5, 2018, re: Daniel G. Moen, U.S. Appl. No. 14/980,231, filed Dec. 28, 2015.
CTNF, mailed on Sep. 10, 2018, re: Roger S. Hoover, U.S. Appl. No. 15/805,114, filed Nov. 6, 2017.
NOA, mailed on Sep. 19, 2018, re: Nwokedi Idika, U.S. Appl. No. 15/204,710, filed Jul. 7, 2016.
NOA, mailed on Oct. 24, 2018, re: Marc R. Hansen, U.S. Appl. No. 15/148,139, filed May 6, 2016.
CTNF, mailed on Nov. 16, 2018, re: Siying Yang, U.S. Appl. No. 15/756,557, filed Feb. 28, 2018.
NOA, mailed on Nov. 27, 2018, re: Nwokedi Idika, U.S. Appl. No. 15/204,710, filed Jul. 7, 2016.
CTNF, mailed on Dec. 19, 2018, re: Oscar H. Steele III, U.S. Appl. No. 15/224,985, filed Aug. 1, 2016.
CTNF, mailed on Dec. 26, 2018, re: Siying Yang, U.S. Appl. No. 15/242,062, filed Aug. 19, 2016.
CTNF, mailed on Jan. 24, 2019, re: Nwokedi Idika, U.S. Appl. No. 14/728,596, filed Jun. 2, 2015.
NOA, mailed on Feb. 7, 2019, re: Siying Yang, U.S. Appl. No. 15/805,073, filed Nov. 6, 2017.
CTFR, mailed on Mar. 28, 2019, re: Roger S. Hoover, U.S. Appl. No. 15/805,114, filed Nov. 6, 2017.
NOA, mailed on Mar. 25, 2019, re: Siying Yang, U.S. Appl. No. 15/756,557, filed Feb. 28, 2018.
CTFR, mailed on Jun. 7, 2019, re: Siying Yang, U.S. Appl. No. 15/242,062, filed Aug. 19, 2016.
CTFR, mailed on Mar. 21, 2019, re: Justin D. Call, U.S. Appl. No. 14/922,436, filed Oct. 26, 2015.
CTFR, mailed on Jul. 1, 2019, re: Nwokedi Idika , U.S. Appl. No. 14/728,596, filed Jun. 2, 2015.
NOA, mailed on Aug. 28, 2019, re: Justin Call, U.S. Appl. No. 15/925,748, filed Mar. 19, 2018.
CTNF, mailed on Aug. 8, 2019, re: Marc R. Hansen, U.S. Appl. No. 16/233,455, filed Dec. 27, 2018.
CTNF, mailed on Sep. 26, 2019, re: Roger S. Hoover, U.S. Appl. No. 15/805,114, filed Nov. 6, 2017.
NOA, mailed on Oct. 2, 2019, re: Oscar H. Steele III, U.S. Appl. No. 15/224,985, filed Aug. 1, 2016.
CTNF, mailed on Oct. 21, 2019, re: Justin D. Call, U.S. Appl. No. 14/922,436, filed Oct. 26, 2015.
CTFR, mailed on Nov. 20, 2019, re: Siying Yang, U.S. Appl. No. 15/242,062, filed Aug. 19, 2016.
CTNF, mailed on Dec. 31, 2019, re: Justin Call, U.S. Appl. No. 16/024,621, filed Jun. 29, 2018.

* cited by examiner

CLIENT/SERVER SECURITY BY AN INTERMEDIARY RENDERING MODIFIED IN-MEMORY OBJECTS

BENEFIT CLAIM

This application claims the benefit as a Continuation of U.S. application. Ser. No. 14/929,019 filed Oct. 30, 2015, which is a Continuation of U.S. application Ser. No. 14/099, 437, filed Dec. 6, 2013, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s). SUGGESTED GROUP ART UNIT: 2496 (SAME AS PARENT REFERENCED ABOVE); SUGGESTED CLASSIFICATION: 726/003 (SAME AS PARENT REFERENCED ABOVE).

FIELD OF THE DISCLOSURE

The present disclosure generally relates security techniques applicable to client/server systems, and relates more specifically to techniques for improving the security of web applications and data sent and/or received between web servers hosting the web applications and browser programs and/or components of browsers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer fraud performed by obtaining information in non-secure communications transmissions between browser programs and server computers is big business for fraudsters. Fraud can be perpetrated by obtaining financial or personally identifying information that end users provide while using a browser to communicate with an application server computer. For example, in an exploit commonly termed "Man in the Browser", a user's computer can be provided with malicious code that collects data from legitimate communications, such as communications with the user's bank. After the communications have been decrypted, for example, by a web browser on the user's computer, the malicious code may gather data that is displayed in particular fields or sections in the decrypted web page and provide the data to a malicious user or computer.

Malicious code may also gather data that is entered by a user before the user's data is encrypted and sent to the intended recipient. For example, a user may enter account information into a web browser that is displaying a web page from the user's bank. The web page may be a login page to access the user's account information and funds. The malicious code may scan particular fields in the web page for the user's account information before the user's account information is encrypted and sent to the user's bank, and then send data obtained from those fields to a malicious user or computer. Web browsers were first developed and deployed in the early 1990's, and thus there has been a need to improve browser security, web server security, web-based application security, and data security at and/or between end points.

SUMMARY

The appended claims may serve as a summary of the invention.

Figure 1:
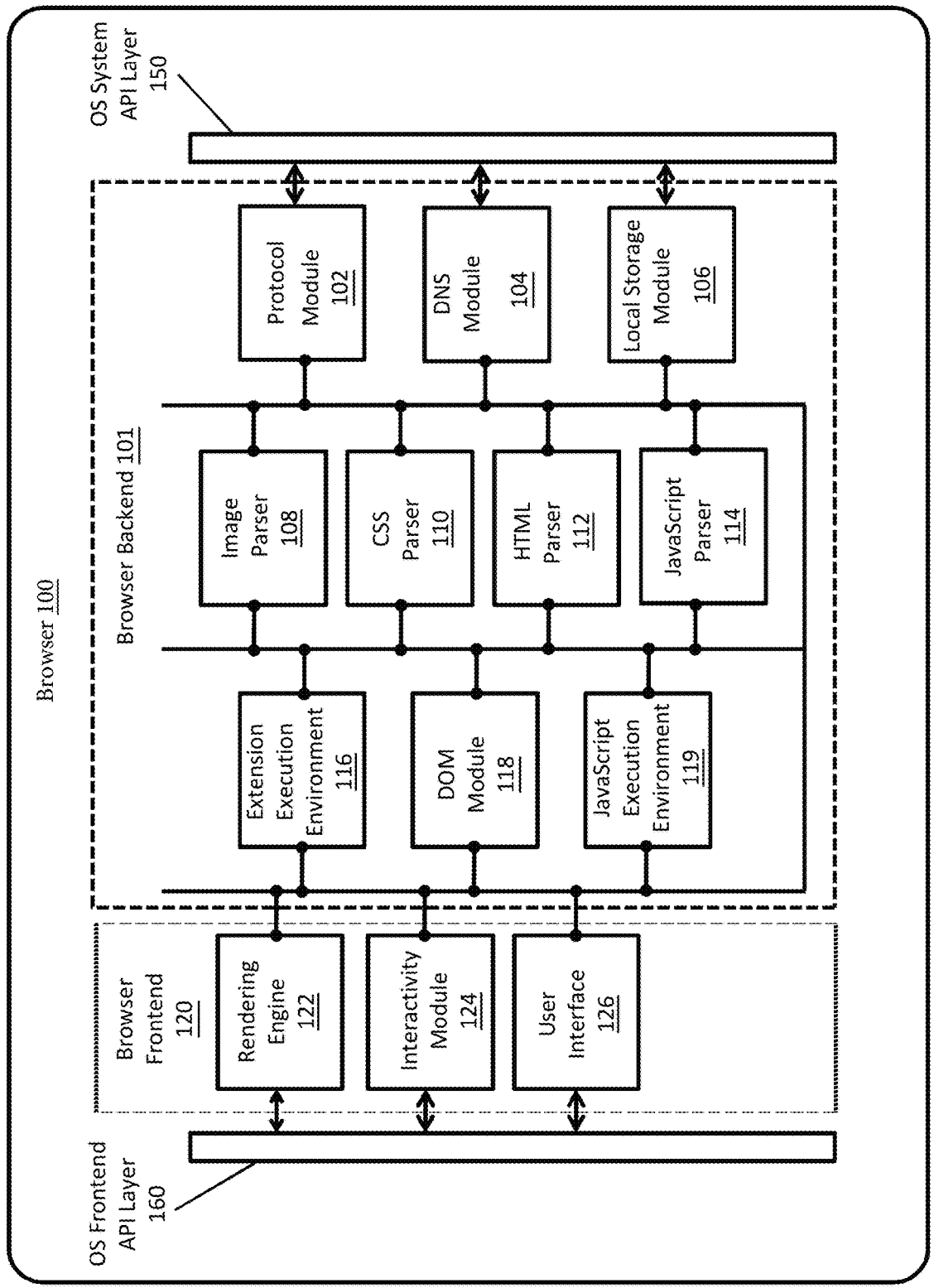
FIG. 1 illustrates functional units of a web browser, in an example embodiment.

While each of the drawing figures illustrates a particular embodiment for purposes of illustrating a clear example, other embodiments may omit, add to, reorder, and/or modify any of the elements shown in the drawing figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 Terms
  2.0 General Overview
  3.0 Network Topology
    3.1 Visitor Browser
      3.1.1 Browser Frontend
      3.1.2 Browser Backend
    3.2 Web Infrastructure
    3.3 Intermediary
      3.3.1 Protocol Client
      3.3.2 Browser Backend
      3.3.3 Forward Translator
      3.3.4 Protocol Handler
      3.3.5 Transaction Store
      3.3.6 Reverse Translator 4.0 Process Overview
    4.1 Intercepting Instructions from a Content Server Computer and Generating New Instructions
    4.2 Caching Rendered Instructions
    4.3 Intercept a Request from a Client Computer and Translate the Request into a New Request based on a Stored Mapping
    4.4 Methods for an HTTP-based System
5.0 Implementation Mechanisms—Hardware Overview
6.0 Other Aspects of Disclosure 1.0 Terms In certain embodiments:

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

An "object" may be a data structure that can be identified by an identifier and/or a relationship with another object. For example, an object may have a unique identifier that is a string, such as a document, customer number, or username. Accordingly, the object may be referenced and/or retrieved using the identifier. Also for example, if a particular object is the first child object of a parent object, then the particular object may be referenced and/or retrieved using a pointer to the parent object and then retrieving a pointer to the first child object. A method of referencing objects by identifier and/or relationships is called XPath. An object may be a particular type of object. For example, one object may be a button, another object may be an input, or specifically a text field, and another object may be an image.

An "attribute" may be data that identifies and/or describes the appearance, behavior, and/or content of an object. For example, an attribute may be a unique identifier, such as a name. An attribute may indicate that an object is a type of input, such as a text field, text area, checkbox, and/or radio button. An attribute may indicate that an object is a password text field; accordingly, a client application rendering the text field object on a monitor need not cause the characters that are entered into the field object to be displayed. An attribute associated with the text field object may be updated to include the value entered in the text field. Other attributes may define or describe dimension, position, color, visibility, value, and any other functional or visual aspect of an object.

A "document object model" ("DOM") may be a cross-platform and language-independent representation of one or more objects that are interrelated. For example, a DOM may represent one or more objects in an object tree and/or hierarchy. An object within the hierarchy may be a parent object, which has one or more child objects. A child object may also have one or more child objects.

"Creating, updating, and/or removing an object" may mean creating, updating, and/or removing a data structure in memory that represents an object, an object's attributes, and/or relationships between an object and one or more other objects; because these processes directly or indirectly involve changing the state of registers or other structures in electronic digital memory circuits, the processes necessarily involve using a computer to transform the state of tangible things.

An "operation" may be any function, method, script, and/or any other code, which when executed operates on an object.

"Operating on an object" may mean creating, removing, and/or updating an object. Additionally, "operating on an object" may mean performing one or more operations that use an object, attribute, and/or relationship between an object and one or more other objects as input.

"Instructions" may mean one or more codes that define one or more objects and/or one or more operations. For example, instructions may comprise HyperText Markup Language ("HTML"), eXtensible Markup Language ("XML"), cascading style sheets ("CSS"), JavaScript, and/or any other standard or proprietary languages or codes that define objects, attributes, relationships between objects, and/or operations.

"Performing instructions" or "executing instructions" may mean creating one or more objects and/or performing one or more operations defined by the instructions.

"Rendering instructions" may mean generating one or more instructions based on objects and/or operations stored in memory, such that when the generated one or more instructions are executed the same objects and/or same operations are created in memory.

A first object may be the "same" as a second object if the first object maintains the same one or more values, attributes, and/or relationships as the second object. The underlying representation of the first object in memory need not be the same as the underlying representation of the second object in memory. For purposes of illustrating a clear example, assume that a first program is allocated a first memory segment; a second program is allocated a second segment; the first program maintains a first object in the first memory segment; the second program maintains a second object in the second memory segment; the first object comprises a value: six; the second object comprises a value: six. In this situation, the first object and the second object may be the same object because the first object maintains the same value as the second object, even though the first object and the second object are located in different memory segments.

If the value stored in the first memory segment is stored as an 8-bit integer and the value stored in the second memory segment is stored as an American Standard Code for Information Interchange ("ASCII") string, then the first object and the second object may be the same object because the first object maintains the same value as the second object, even though the underlying representation of the value in the first memory segment is stored differently than the representation of the value in the second memory segment.

As another example, assume that the first program is running on a first computer that comprises a 32-bit processor and addresses memory using 32-bit addresses; the second program is running on a second computer that comprises a 64-bit processor and addresses memory using 64-bit addresses; the first object is a parent object and comprises a pointer to a child object stored in the first memory segment; the second object is a parent object and comprises a pointer to a child object stored in the second memory segment. In this situation, the first object and the second object may be the same object because the first object maintains the same values and relationships as the second object, even though the pointer to the child stored in the first memory segment may be a 32-bit pointer and the pointer in the second memory segment may be a 64-bit pointer.

If the first program stores the data that represents the first object contiguously in the first memory segment and the second program stores the data that represents the second object scattered throughout the second memory segment, then the first object and the second object may be the same object, even though the underlying data structure that represents the first object is stored differently than the underlying data structure that represents the second object.

Or, for example, assume the first program is a first HTTP browser; the second program is a second, different HTTP browser; the first object may have an attribute, "id"; the second object may have an attribute, "id"; the value for the "id" attribute is "MyObject" for both the first object and the second object is. In this situation, the underlying representation of the first object in the first browser may be drastically different than the underlying representation of the second object in the second browser. However, the operations that operate on the two objects may be programmatically identical. For example, the same JavaScript executed by the first HTTP browser and the second HTTP browser may retrieve the first object maintained by the first HTTP browser and the second object, respectively: document-.getElementById("MyObject").

Other factors that may result in a different underlying representation of the same object may include the endianness of a processor, amount of memory available, different applications, and/or any other different hardware and/or software configurations.

"Data" may mean any data and/or instructions in electronic digital memory.

An "attribute map" may be a map from one attribute name and/or value to one or more other names and/or values. For example, assume an object has an attribute, "id", which defines a unique identifier: "MyObject". An attribute map may associate "MyObject" with a different unique identifier, such as "tcejbOyM". Additionally, an attribute map may be used to map a modified attribute name and/or value to an original name and/or value. An attribute map may be an operation, hash map, and/or any other method or associative data structure.

A "DOM map" may be a map from a first DOM to a second, different DOM. For example, a DOM map may be a collection of attribute maps. Each attribute map in the DOM map may be an attribute map for an attribute of an object in a first DOM with a modified attribute in a second DOM. Additionally or alternatively, a DOM map may map one hierarchy to another, different hierarchy, and back again. For example, a DOM map may modify a relationship between a first object and a second object, such that a first object is not related to a second object in a first DOM, and the first object is a parent object to the second object in the second DOM.

A "browser" may be one or more computer programs or other software elements stored in electronic digital memory and running on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a mobile application as part of a web view, and/or web view controller, to send and/or receive data over HTTP and/or other protocol. A user may use a browser to send data to a server computer. The server computer may respond with additional instructions.

A "headless browser" may be a browser that does not cause visually displaying or rendering graphical images of objects that are defined in a set of received instructions according to the received set of instructions. Additionally or alternatively, a "headless browser" may be a browser that does not respond to user inputs according to a set of received instructions.

"Sending and/or receiving data over HTTP" may mean sending and/or receiving data and/or instructions using HyperText Transfer Protocol. Additionally or alternatively, "sending and/or receiving data over HTTP" may mean sending and/or receiving data and/or instructions using a subset of the HTTP, such as secure HTTP (HTTPS). Additionally or alternatively, one or more other protocols may be used, such as SPDY.

A "web browser" may be a browser that receives instructions comprising HTML, CSS, and/or JavaScript over HTTP or some derivative thereof, such as HTTPS.

A "bot" may mean a computer and/or software executed by a computer that automates sending and/or receiving data. For example, a bot may be a web scraper, web crawler, automatic web browser, and/or any other tool designed to submit and/or receive data from one or more web servers. A bot may comprise complex logic designed to respond to data received from one or more web servers.

2.0 General Overview

In an embodiment, performing one or more of the methods discussed herein may prevent, and/or reduce the effectiveness of, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities. For example, if an intermediary computer intercepts an improper request from a visitor browser, such as a request that does not include one or more identifiers that match one or more attribute map identifiers, DOM map identifiers, and/or transaction identifiers, then the intermediary computer need not reverse translate and/or forward the improper request on to the targeted web server computer. Thus, the targeted web server computer, or an application running on the targeted web server computer, need not be burdened with processing improper and/or malicious requests that are part of an attack.

In an embodiment, after an intermediary computer intercepts a request with a particular identifier, based on a rendered set of instructions by the intermediary computer, the particular identifier may no longer be valid. Accordingly, if the same visitor browser and/or a different visitor browser uses the same particular identifier in an additional request, the intermediary computer need not reverse translate and/or forward the improper request to the targeted web server computer. Thus, the targeted web server computer, or an application running on the targeted web server computer, need not be affected by one or more attacks, such as a DOS attack and/or cross-site request forgery.

In an embodiment, each time a web page is requested, such as an account creation page, order page, voting page, and/or other page from a web server computer, the intermediary computer may modify the identifiers in the returned page. Thus, a bot may receive a different set of instructions after each request and may not observe the same one or more field identifiers twice. Without receiving the same one or more identifiers, the bot may be incapable of determining what data should be entered in and/or associated with each field to create a fake account, order and/or reserve one or more goods or services, vote, inject malicious SQL, and/or submit any other malicious content.

In an embodiment, the DOM hierarchy, a portion of the DOM hierarchy, and/or one or more particular identifiers are modified each time a web page is requested. For example, a container that stores the definition of a word or phrase may, in the originally intercepted instructions, be in a particular spot in the DOM hierarchy and/or include a particular identifier: "definition". However, the intermediary computer may manipulate the DOM hierarchy and/or identifier each time the page or a similar page is served. Thus, a bot may not be able to determine which container holds the target content. Furthermore, an automated vulnerability bot may not be able to determine whether target content was inserted and/or changed. For example, if a bot submits content designed to employ SQL, HTML, JavaScript, and/or any other code injection, the bot may not be able to determine which container is supposed to contain content generated by a successful attack.

In an embodiment, a bot, such as a website scraper may be whitelisted. If the bot includes a particular password or other code, then the intermediary computer may send the original instructions and/or a portion of the original instructions to the bot. Thus, the intermediary computer may allow the authorized bot to perform an automated task on an entire page and/or a portion of the page. Otherwise, the intermediary computer may use one or more of the methods discussed herein.

In an embodiment, a method comprises intercepting, from a server computer, a first set of instructions that define one or more objects and one or more operations that are based, at least in part, on the one or more objects; generating, in memory, one or more data structures that correspond to the one or more objects; performing the one or more operations on the one or more data structures; updating the one or more data structures, in response to performing the one or more operations, to produce one or more updated data structures; rendering a second set of instructions, which when executed by a remote client computer cause the remote client computer to generate the one or more updated data structures in memory on the remote client computer, wherein the second set of instructions are different than the first set of instructions; sending the second set of instructions to the remote client computer.

In an embodiment, wherein each object of the one or more objects includes an original identifier, the method comprises generating a data structure, for each object of the one or more objects, wherein the data structure corresponds to the object and includes the original identifier included in the object; updating the original identifier included in the data structure for each object to produce a modified identifier and a modified data structure of the one or more updated data structures.

In an embodiment, the method comprises storing a mapping between the modified identifier and the original identifier for each object; intercepting, from the remote client computer, a request that includes one or more modified identifiers; determining the original identifier for each modified identifier included in the request; replacing each modified identifier in the request with the original identifier to produce a modified request; sending the modified request to the server computer.

In an embodiment, a method comprises intercepting, from a web server computer, over HTTP, an original HTML document, a set of original CSS codes, and a set of original JavaScript codes that define one or more objects in an original DOM and one or more operations that are based, at least in part, on the one or more objects in the original DOM; generating one or more data structures that correspond with the one or more objects in the original DOM; processing the set of original CSS codes and the set of original JavaScript codes on the one or more data structures; updating the one or more data structures, in response to processing the set of original CSS codes and the set of original JavaScript codes, to produce one or more updated data structures; rendering a modified HTML document, a set of modified CSS codes, and a set of modified JavaScript codes, which when processed by a remote client computer cause the remote client computer to generate the one or more updated data structures in memory on the remote client computer; wherein the modified HTML document defines a modified DOM that is different than the original DOM; wherein the modified HTML document, the set of modified CSS codes, and the set of modified JavaScript codes are different than the original HTML document, the set of original CSS codes, and the set of original JavaScript codes; generating a DOM mapping between the modified DOM and the original DOM; storing the DOM mapping; sending the modified HTML document, the set of modified CSS codes, and the set of modified JavaScript codes to the remote client computer; intercepting, from the remote client computer, a request based on the modified DOM; translating the request based, at least in part, on the DOM mapping to produce a translated request based on the original DOM; sending the translated request to the web server computer.

3.0 Network Topology

Figure 2:
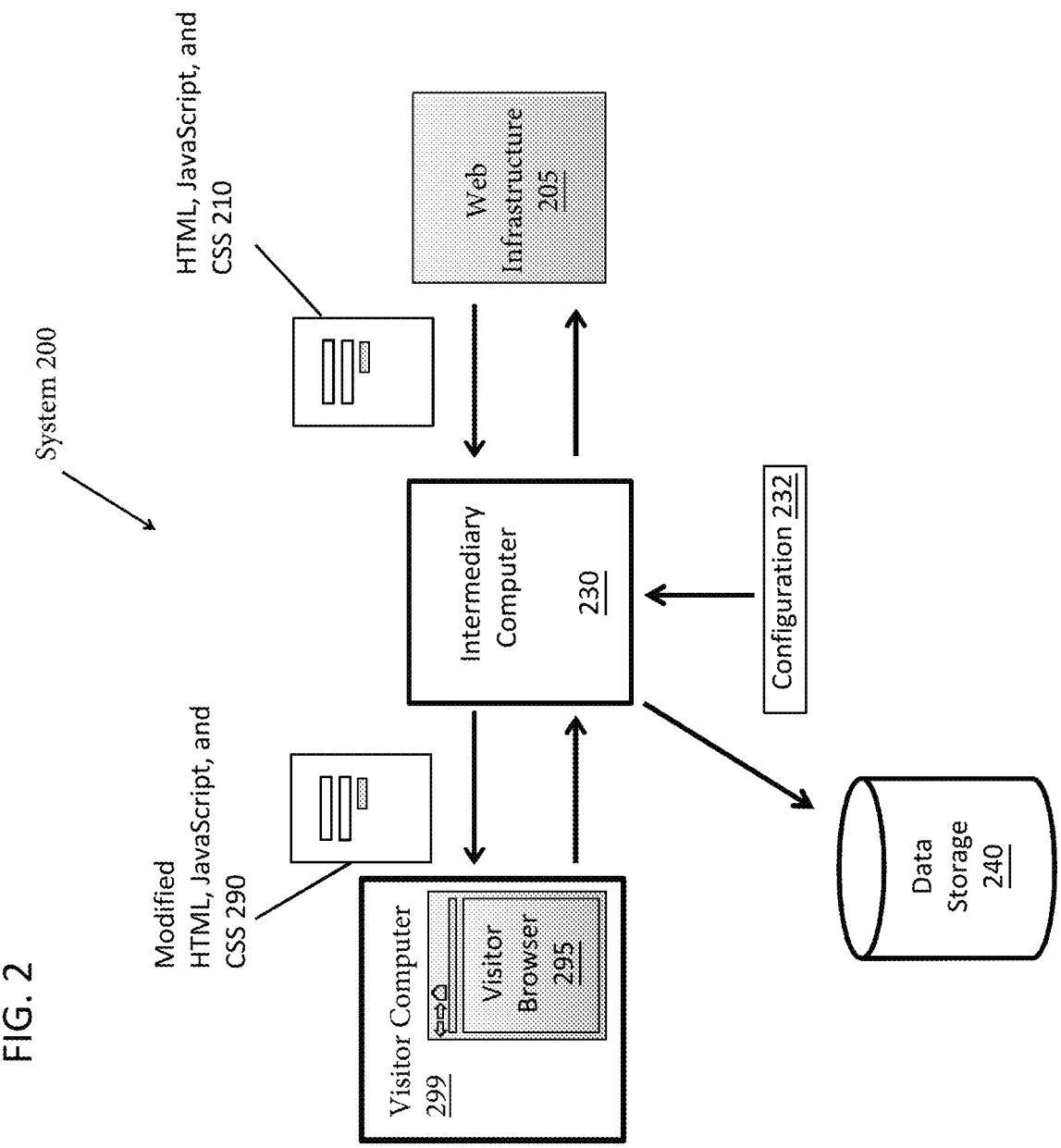
FIG. 2 illustrates a computer system comprising a server security and re-rendering system, in an example embodiment.

FIG. 1 illustrates functional units of a web browser, in an example embodiment. FIG. 2 illustrates a system comprising a server security and a re-rendering system, in an example embodiment. Referring first to FIG. 2, system 200 includes web infrastructure 205, visitor computer 299, intermediary computer 230, and data storage 240, distributed across a plurality of interconnected networks. While each of the components listed above are illustrated as if running on a separate, remote computer from each other, one or more of the components listed above may be part of and/or executed on the same computer. For example, HTTP intermediary computer 230, data storage 240, and/or web infrastructure 205 may be executed on the same computer, local area, and/or wide area network. Additionally or alternatively, intermediary computer 230 is a proxy server for web infrastructure 205. Additionally or alternatively, intermediary computer 230 may be in line between a router and web infrastructure 205, such that all network data sent to, and/or sent from, web infrastructure 205 over one or more protocols may be intercepted by intermediary computer 230.

3.1 Visitor Browser

Visitor browser 295 may be a browser that is executed on visitor computer 299 and operated by a user using visitor computer 299. For example, visitor browser 295 may be a web browser. FIG. 1 illustrates a more detailed view of a web browser, in an example embodiment. In this context, "visitor" refers to any user who is using the computer 299 to contact, communicate with or otherwise conceptually visit the web infrastructure 205. Furthermore, visitor browser 295 may be described with reference to browser 100 in FIG. 1, but using the particular arrangement illustrated in FIG. 1 is not required in other embodiments.

Referring now to FIG. 1, browser 100 includes browser backend 101, browser frontend 120, operating system ("OS") system application programming interface ("API") layer 150, and OS frontend API layer 160.

3.1.1 Browser Frontend

Browser frontend 120 comprises rendering engine 122, interactivity module 124, and user interface 126. Each of the components may cause, through OS frontend API layer 160, one or more objects to be presented and/or updated visually and/or audibly to a user using visitor computer 299.

Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to visitor computer 299 through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to visitor computer 299, the operating system running on visitor computer 299 may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

3.1.2 Browser Backend

Browser backend 101 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 119. Other embodiments may use other protocols, modules, and/or parsers. A browser that includes a browser backend, but does not include a browser frontend, may be a headless browser.

Protocol module 102, DNS module 104, and local storage module 106 may send and/or receive data through OS System API layer 150. For example, protocol module 102 may send and/or receive data over any protocol, such as HTTP, to/from intermediary computer 230 and/or web infrastructure 205 through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser backend 101 may comprise one or more programmable engines, such as extension execution environment 116 and JavaScript execution environment 119. Extensions may be written in one or more programming languages include JavaScript, Python, Ruby, and/or any other language. Each programmable engine may have access to DOM module 118 and may operate on one or more objects from a DOM maintained by DOM module 118. For example, JavaScript execution environment 119 may execute JavaScript parsed by JavaScript parser 114 and in response, create, update, and/or delete one or more objects managed by DOM module 118.

3.2 Web Infrastructure

Referring again to FIG. 2, web infrastructure 205 may be one or more server computers that receive requests for data from users, such as a user using visitor browser 295, through intermediary computer 230. In response, web infrastructure 205 may send data to visitor browser 295, through intermediary computer 230. As illustrated in FIG. 2 the data sent from web infrastructure 205 may include instructions: HTML, JavaScript, and CSS 210.

Figure 3:
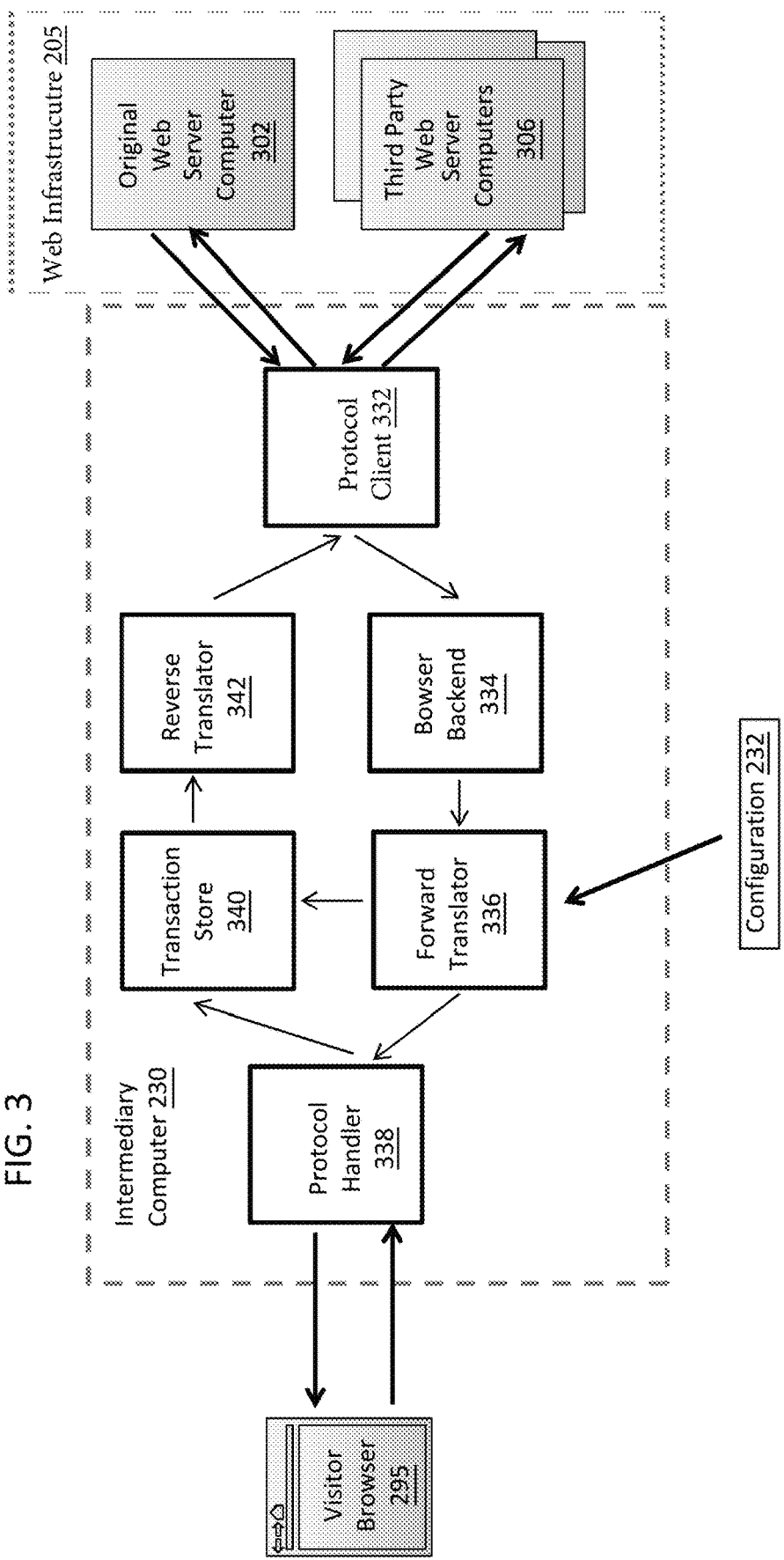
FIG. 3 illustrates an intermediary computer and a web infrastructure in an example embodiment.

FIG. 3 illustrates a web infrastructure in an example embodiment. The web infrastructure 205 may be described with reference to original web server computer 302 and third party web server computers 306 in FIG. 3, but using the particular arrangement illustrated in FIG. 3 is not required in other embodiments.

Original web server computer 302 may be a server computer that receives requests for data and responds with data. For example, original web server computer 302 may be an HTTP-based web server that receives HTTP requests and responds with data comprising HTML, CSS, and/or JavaScript instructions. Additionally or alternatively, original web server computer 302 may respond with data that references data on other server computers, such as third party web server computers 306.

Third party web server computers 306 may be one or more server computers that store additional data referenced by instructions sent from original web server computer 302. For example, data from original web server computer 302 may include a reference to a JavaScript file stored on third party web server computers 306. Accordingly, a browser backend, such as a browser backend 101, may request the referenced JavaScript file from third party web server computers 306. Also for example, data from original web server computer 302 may include a reference to an image stored on third party web server computers 306. Accordingly, a browser backend, such as browser backend 101, may request the referenced image from third party web server computers 306.

3.3 Intermediary

Returning now to FIG. 2, intermediary computer 230 may intercept instructions sent from web infrastructure 205, generate new instructions, and send the new instructions to visitor browser 295. For example, intermediary computer 230 may intercept HTML, JavaScript, and CSS 210, generate HTML, JavaScript, and CSS 290 (which may be different than HTML, JavaScript, and CSS 210), and send HTML, JavaScript, and CSS 290 to visitor browser 295. Additionally, intermediary computer 230 may intercept a request from visitor browser 295, generate a new, modified request, and send the new, modified request to web infrastructure 205.

In FIG. 2, intermediary computer 230 may be an HTTP intermediary that intercepts and modifies HTML, JavaScript, CSS, and HTTP requests for HTTP web browsers. However, intermediary computer 230 may be an intermediary for any other standard and/or proprietary protocol. Furthermore, each of the components discussed, which intermediary computer 230 is comprised of, may be configured to perform any of the processes and/or methods discussed herein for any standard and/or proprietary protocol.

Intermediary computer 230 may be a server computer that is located on the same network as web infrastructure 205. Additionally or alternatively, intermediary computer 230 may be topologically located between a public-facing router and web infrastructure 205. Accordingly, requests from visitor browser 295 to web infrastructure 205 may be passed through and/or modified by intermediary computer 230. Furthermore, instructions from web infrastructure 205 to visitor browser 295 may be passed through and/or modified by intermediary computer 230. Additionally or alternatively, intermediary computer 230 may be a proxy server and/or router. Additionally or alternatively, intermediary computer 230 and/or components of intermediary computer 230 may be a software layer, executed on one or more computers in web infrastructure 205. Additionally or alternatively, intermediary computer 230 may be a server computer that one or more domain name servers list as a destination IP address. Accordingly, intermediary computer 230 may receive requests sent to the one or more domains from visitor browser 295. Based on the domain name in a request, intermediary computer 230 may forward the request, or a modified request, to a server computer in web infrastructure 205, such as original web server computer 302.

FIG. 3 illustrates, among other things, a more detailed view of intermediary computer 230, in an example embodiment. The intermediary computer 230 may be described with reference to several components illustrated in FIG. 3 and discussed in detail below, but using the particular arrangement illustrated in FIG. 3 is not required in other embodiments. Turning now to FIG. 3, intermediary computer 230 may comprise protocol client 332, browser backend 334, forward translator 336, protocol handler 338, transaction store 340, and reverse translator 342. In an embodiment, each of the functional units of intermediary computer 230 may be implemented using any of the techniques further described herein in connection with FIG. 9; for example, the intermediary computer may comprise a general-purpose computer configured with one or more stored programs which when executed cause performing the functions described herein for the intermediary computer, or a special-purpose computer with digital logic that is configured to execute the functions, or digital logic that is used in other computing devices.

3.3.1 Protocol Client

Protocol client 332 may intercept data over any standard or proprietary protocol. For example, protocol client 332 may intercept data over HTTP. Accordingly, protocol client 332 may be communicatively coupled with web infrastructure 205, original web server computer 302, and third party web server computers 306.

3.3.2 Browser Backend

Browser backend 334 may be an HTTP-based headless browser similar to browser backend 101. Additionally or alternatively, browser backend 334 may be a headless browser based on one or more other standard and/or proprietary protocols.

Browser backend 334 may perform instructions intercepted by protocol client 332. After performing the instructions, browser backend 334 may notify forward translator 336 to begin rendering instructions based on the objects created by browser backend 334 that are currently in memory. Accordingly, browser backend 334 and forward translator 336 may be communicatively coupled.

Browser backend 334 may make requests for additional data. For example, if instructions received from Protocol client 332 reference additional instructions stored on a third party web server, browser backend 334 may request the additional instructions through protocol client 332. Accordingly, browser backend 334 and protocol client 332 are communicatively coupled.

3.3.3 Forward Translator

Forward translator 336 may operate on the objects created by browser backend 334 and generate one or more attribute maps and/or DOM maps. Additionally or alternatively, forward translator 336 may render a new set of instructions based on the one or more objects and/or operations in memory. Forward translator 336 may operate on objects and/or render instructions based on one or more configurations specified in configuration 232. Accordingly, forward translator 336 may be communicatively coupled to configuration 232. Forward translator 336 may send the rendered instructions to protocol handler 338. Accordingly, forward translator 336 may be communicatively coupled to protocol handler 338.

3.3.4 Protocol Handler

Protocol handler 338 may receive the instructions generated by forward translator 336 and send the generated instructions to visitor browser 195. Additionally or alternatively, protocol handler 338 may intercept requests from visitor browser 195 and forward the requests to transaction store 340. Accordingly, protocol handler 338 may be communicatively coupled to visitor browser 195, forward translator 336, and transaction store 340.

3.3.5 Transaction Store

Transaction store 340 may receive requests intercepted by protocol handler 338 from visitor browser 295. Transaction store 340 may retrieve one or more attribute maps and/or DOM maps, based on data in the request, and forward the request with the retrieved one or more attribute maps and/or DOM maps to reverse translator 342. Accordingly, transaction store 340 may be communicatively coupled with reverse translator 342.

3.3.6 Reverse Translator

Reverse translator 342 may translate requests intercepted by protocol handler 338, which are based on instructions generated by forward translator 336, into requests that would have been generated by visitor browser 195 had visitor browser 195 received the original instructions sent from original web server computer 302. Reverse translator 342 may translate requests based on the one or more attribute maps and/or DOM maps retrieved by transaction store 340. Reverse translator 342 may send the translated request to original web server computer 302 through protocol client 332. Accordingly, reverse translator 342 may be communicatively coupled with protocol client 332.

4.0 Process Overview

In an embodiment, a data processing method may be configured to intercept instructions from a server computer and generate new, different instructions based on the intercepted instructions. In an embodiment, a data processing method may be configured for caching new instructions, intercepting client requests to a server computer, translating the request to produce a new request, and/or sending the new request to a server computer. Various embodiments may use HTTP and/or specialized web-based instructions, such as HTML, CSS, and/or JavaScript, and/or standard and/or proprietary protocol(s) and/or instructions.

Figure 4:
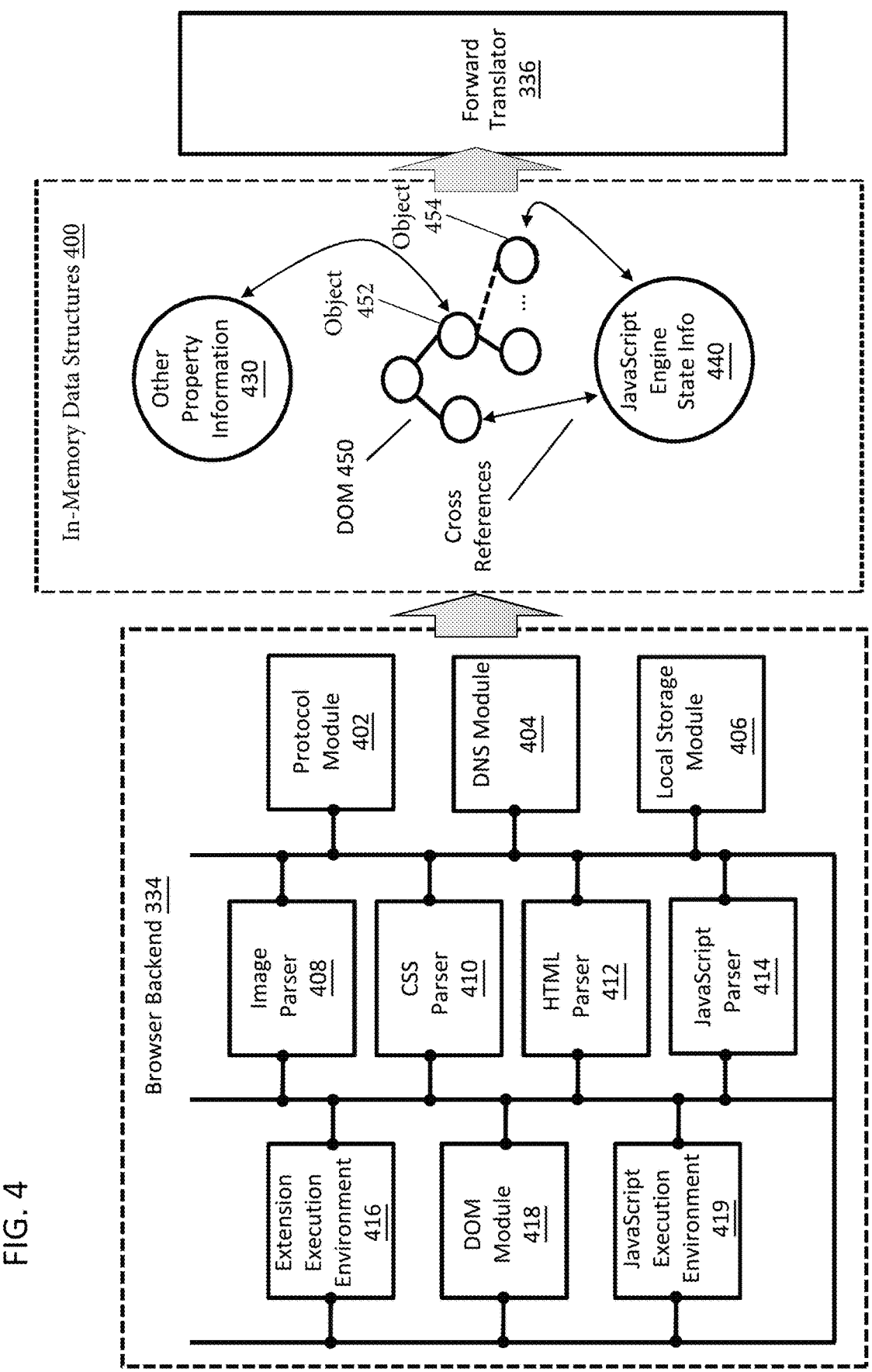
FIG. 4 illustrates objects and operations stored in memory by a browser backend, or headless browser, in an example embodiment.
Figure 5:
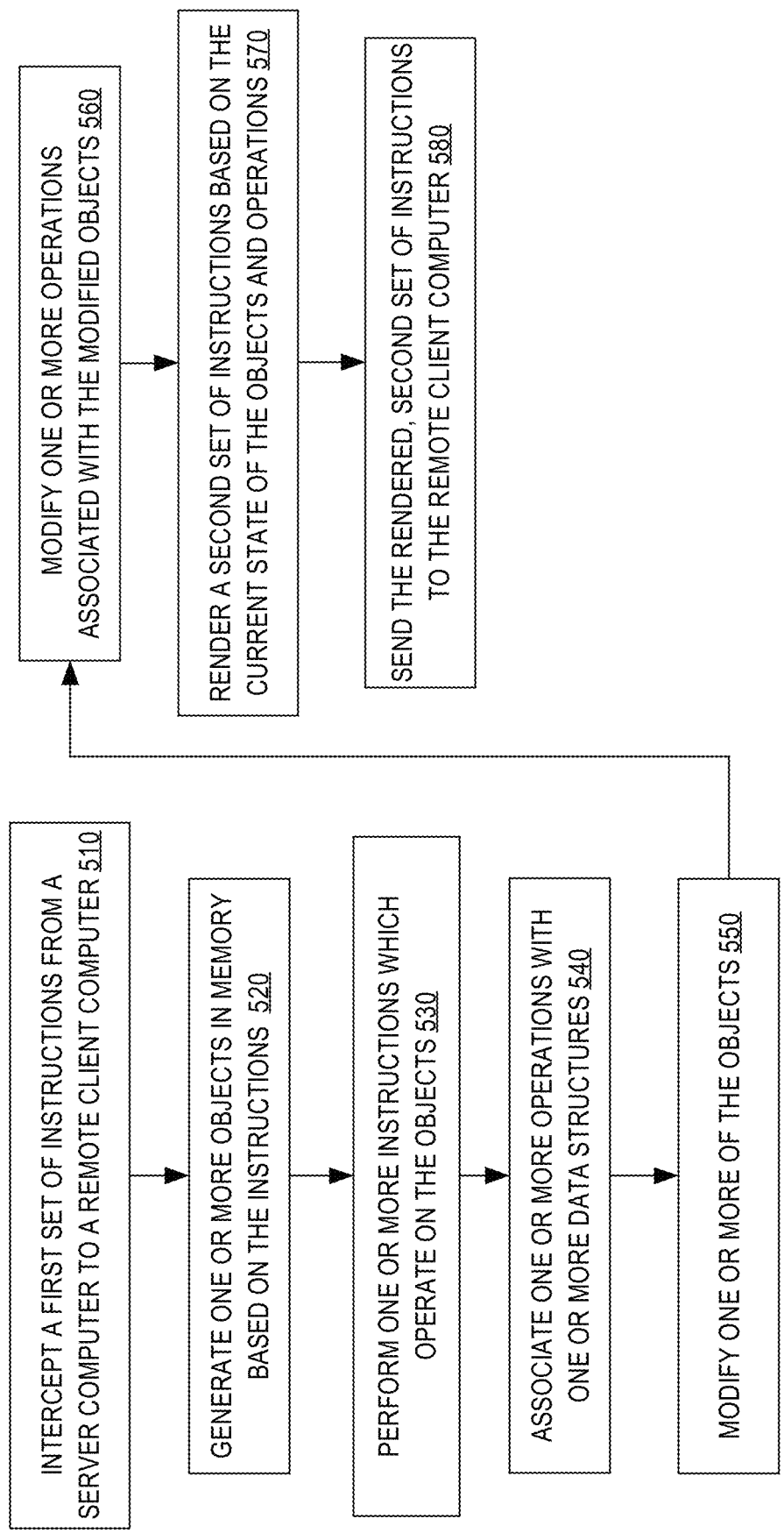
FIG. 5 illustrates a process for intercepting instructions for a server computer, rendering new instructions, and sending the new instructions to the intended client, in an example embodiment.

4.1 Intercepting Instructions from a Content Server Computer and Generating New Instructions FIG. 5 illustrates a process for intercepting instructions for a server computer, rendering new instructions, and sending the new instructions to the intended client, in an example embodiment. For purposes of illustrating a clear example, FIG. 5 may be described with reference to FIG. 3 and FIG. 4, but using the particular arrangements illustrated in FIG. 3 or FIG. 4 are not required in other embodiments.

Turning now to step 510, in FIG. 5, an intermediary computer intercepts a first set of instructions from a remote server computer. For example, protocol client 332 may receive instructions from original web server computer 302, in response to a request from visitor browser 295. The instructions may comprise HTML, CSS, and/or JavaScript.

In step 520, the intermediary computer generates one or more objects in memory based on the instructions. For example, protocol client 332 may send the HTML, CSS, and/or JavaScript to browser backend 334. Browser backend 334 may generate a DOM in memory containing objects defined in the instructions. FIG. 4 illustrates objects and operations stored in memory by browser backend 334, in an example embodiment. HTML parser 412 may parse the HTML received by browser backend 334. Based on the parsed HTML, DOM module 418 may create DOM 450 and objects in DOM 450: object 452 and object 454. Furthermore, based on the parsed HTML, DOM module 418 may define object 452 to be the parent object of object 454 in DOM 450. Additionally, one or more objects in DOM 450 may comprise one or more attributes based on the parsed HTML.

In step 530, the intermediary computer performs one or more instructions which operate on the objects. For purposes of illustrating a clear example, assume object 452 comprises an attribute that is a unique identifier. Also assume one or more CSS instructions identify object 452 by its unique identifier and define one or more attributes to assign to, and/or associate with, object 452. Accordingly, CSS parser 410 may parse the CSS received by browser backend 334. DOM module 418 may create and/or update other property information 430 to include the one or more attributes defined in the CSS instructions. DOM module 418 may associate other property information 430, and/or one or more attributes in other property information 430, to object 452.

As an example, the JavaScript instructions define one or more operations, which when performed operate on one or more objects defined in the HTML instructions. One or more JavaScript instructions may indicate that the one or more operations may be performed after the objects defined in the HTML instructions are loaded in memory and/or after the CSS instructions have been performed without additional user input. The JavaScript parser 414 may parse the JavaScript received by browser backend 334. JavaScript execution environment 419 may execute the one or more operations, which operate on the one or more the objects, one or more attributes of objects, and/or relationships between the objects in DOM 450.

Instructions performed after the objects defined in the HTML instructions are loaded in memory may drastically change the DOM and/or the objects in the DOM. For example, one or more JavaScript operations may change object 452 to a different type of object. Also for example, one or more JavaScript operations may create, update, and/or delete object 452. Additionally or alternatively, one or more JavaScript operations may create, update, and/or delete data included and/or associated with object 452. Additionally or alternatively, one or more JavaScript operations may create, update, and/or remove associations between objects. For example, one or more JavaScript operations may associate object 452 with object 454, such that object 452 may become a parent object of object 454, as illustrated by the dashed line between object 452 and object 454.

In step 540, the intermediary computer associates one or more operations with one or more objects. As an example, the JavaScript instructions may define an operation, which when performed, operate on one or more objects defined in DOM 450; the operation references object 454 by an identifier; object 454 is the second child of object 452; object 454 is a particular type of object, which is different than the other objects that are children objects of object 452; and one or more JavaScript instructions indicate that the operation may be performed upon some event, such as a user selecting button and/or entering an input.

JavaScript parser 414 may parse the JavaScript received by browser backend 334, which defines the operation. JavaScript parser 414, DOM module 418, and/or JavaScript execution environment 419 may generate JavaScript engine state info 440 included in in-memory data structures 400. JavaScript parser 414, DOM module 418, and/or JavaScript execution environment 419 may generate a representation of the operation that references object 454 in JavaScript engine state info 440. The representation of the operation in JavaScript engine state info 440 may include a cross reference to an identifier for object 454. Additionally or alternatively, the representation of the operation in JavaScript engine state info 440 may include a cross reference to an identifier for object 454 based on the topology of object 454 in DOM 450: second child of object 452 and/or first child of object 452 that is the particular type, which is a different type than the type(s) of other child objects of object 452. JavaScript engine state info 440 may include one or more other operations and/or representations of one or more other operations.

In step 550, the intermediary computer modifies one or more of the objects. For example, forward translator 336 may create, update, and/or delete identifiers for one or more of the objects in DOM 450, such as the names of the one or more objects. Forward translator 336 may implement one or more methods to modify identifiers, such as generating random identifiers.

In step 560, the intermediary computer modifies one or more operations associated with the modified objects. For example, forward translator 336 may update the references in JavaScript engine state info 440 to use the new identifiers from step 550.

In step 570, the intermediary computer renders a second set of instructions based on the current state of the objects and operations. As discussed earlier, the originally received instructions need not be HTML, CSS, and/or JavaScript instructions. Furthermore, the rendered instructions need not be HTML, CSS, and/or JavaScript instructions. However, for purposes of illustrating a clear example, assume that the originally received instructions in step 510 comprise HTML, CSS, and JavaScript instructions. Furthermore, assume that forward translator 336 is configured to generate HTML, CSS, and/or JavaScript instructions. The forward translator 336 may render instructions, which when executed, generate the same objects and/or operations as currently existing in in-memory data structures 400. However, the rendered instructions may comprise different HTML, CSS, and/or JavaScript codes that the originally receive HTML, CSS, and JavaScript instructions. For example, the rendered instructions may use different identifiers for the objects defined in the rendered instructions than the original instructions.

Additionally or alternatively, the original instructions may comprise HTML, CSS, and/or JavaScript instructions and the rendered instructions may have one or more of the object attributes originally defined in the CSS instructions integrated into the HTML instructions and/or the JavaScript instructions. Accordingly, in an embodiment, the rendered instructions may comprise HTML and JavaScript instructions, but not CSS instructions. However, the new, rendered HTML and JavaScript instructions, when executed, may generate objects and/or operations that are the same as the objects and/or operations in in-memory data structures 400 when the new HTML and JavaScript instructions were rendered.

Additionally or alternatively, the rendered instructions may comprise HTML and/or CSS instruction that define fewer objects than defined in in-memory data structures 400. However, the rendered JavaScript instructions may define operations, which when executed generate objects that were not defined in the rendered HTML and/or CSS instructions. Therefore, the new, rendered HTML, CSS, and JavaScript instructions, when executed, may generate objects and/or operations that are the same as the objects and/or operations in in-memory data structures 400 when the new instructions were rendered.

Additionally or alternatively, the rendered instructions may comprise one or more HTML documents, which comprise the original CSS instructions and/or JavaScript instructions embedded into the one or more HTML documents. Accordingly, the new, rendered HTML instructions, when executed, may generate objects and/or operations as currently existing in in-memory data structures 400 when the new HTML instructions were rendered.

Additionally or alternatively, the rendered CSS and/or JavaScript instructions may reference objects by XPath commands instead of by one or more unique identifiers, or vice versa. XPath commands may be used to identify objects in a DOM and/or hierarchy by the topology of the DOM and/or hierarchy. Accordingly, the new, rendered HTML, CSS, and JavaScript instructions, when executed, may generate objects and/or operations that are the same as the objects and/or operations in in-memory data structures 400 when the new instructions were rendered.

Additionally or alternatively, the rendered HTML instructions may define objects in in-memory data structures 400, but without one or more attributes. However, the rendered CSS instructions and/or JavaScript instructions may define operations, which when executed, update the objects to include the missing attributes. Accordingly, the new, rendered HTML, CSS, and JavaScript instructions, when executed, may generate objects and/or operations that are the same as the objects and/or operations in in-memory data structures 400 when the new instructions were rendered.

Additionally or alternatively, the rendered HTML instructions may define the objects in in-memory data structures 400, but in a different hierarchy, such as the relationship between object 452 and object 454 is not defined. However, the rendered JavaScript instructions may define operations, which when executed may update and/or re-organize the relationships between the objects such that object 452 is the parent object of object 454.

Additionally or alternatively, the rendered instructions need not comprise the same programming language(s), scripting language(s), and/or data interchange format(s) as the original instructions intercepted in step 510. For example, the rendered instructions may comprise one or more other standard and/or proprietary languages, formats, and/or codes that are not included in the originally intercepted instructions: Dynamic HTML, XML, eXtensible Stylesheet Language, VB Script, Lua, YAML Ain't Markup Language ("YAML"), JavaScript Object Notation ("JSON"), shell script, Java, Ruby, Python, and/or Lisp.

Additionally or alternatively, the rendered instructions may reference the IP address and/or domain name of intermediary computer 230. For example, a link defined in the original instructions may include the IP address of original web server computer 302. Accordingly, forward translator may replace the IP address of original web server computer 302, with the address of intermediary computer 230. If a user selects the link through a user interface (for example through visitor browser 195), then a request may be sent to the IP address of intermediary computer 230 instead of the IP address of original web server computer 302.

Forward translator 336 may use configuration 232 to determine which method(s) to use to perform step 560 and/or step 570. Accordingly, one or more of the methods discussed herein, alone or in combination, may be a polymorphic protocol defined in configuration 232. Additionally or alternatively, configuration 232 may define which objects and/or types of objects may be modified based on one or more of the methods discussed herein. Additionally or alternatively, configuration 232 may define which objects and/or or types of objects need not be modified based on one or more of the methods discussed herein. Configuration 232 may be a database, a configuration file, and/or any other method of storing preferences. Configuration 232 may store more than one configuration for one or more web servers in web infrastructure 205. Intermediary computer 230 may select a configuration in configuration 232 based on any number of factors. For example, intermediary computer 230 may select a configuration in configuration 232 based on a domain associated with the server computer that the instructions were intercepted from. Additionally or alternatively, intermediary computer 230 may select a configuration in configuration 232 based on a random variable seeded by time. Additionally or alternatively, intermediary computer 230 may select a configuration in configuration 232 based on attributes and/or properties of visitor browser 295. For example, intermediary computer 230 may select a configuration based on what types of instructions visitor browser 295 is capable of interpreting and/or processing.

In step 580, the intermediary computer sends the rendered, second set of instructions to the remote client computer. For example, forward translator 336 sends the rendered instructions to protocol handler 338. Protocol handler 338 sends the rendered instructions to visitor browser 295, which was the originally intended recipient of the data intercepted in step 510.

4.2 Caching Rendered Instructions

Intermediary computer 230 may render different instructions each time it receives instructions from web infrastructure 205 and/or original web server computer 302, regardless of whether the intercepted instructions are the same as a previous set of instructions. However, rendering instructions may be processor and/or memory intensive and take a substantial amount of time. Accordingly, intermediary computer 230 may cache instructions rendered by intermediary computer 230 in data storage 240. In response to receiving the same instructions from web infrastructure 205 and/or original web server computer 302, intermediary computer 230 may send the rendered instructions already cached in data storage 240, instead of re-rendering the intercepted instructions. While intermediary computer 230 may reduce its processing load by sending cached, rendered instructions, bots may be updated based on the cached, rendered instructions. Accordingly, intermediary computer 230 may refresh the cached instructions periodically and/or in response to one or more conditions.

Figure 6:
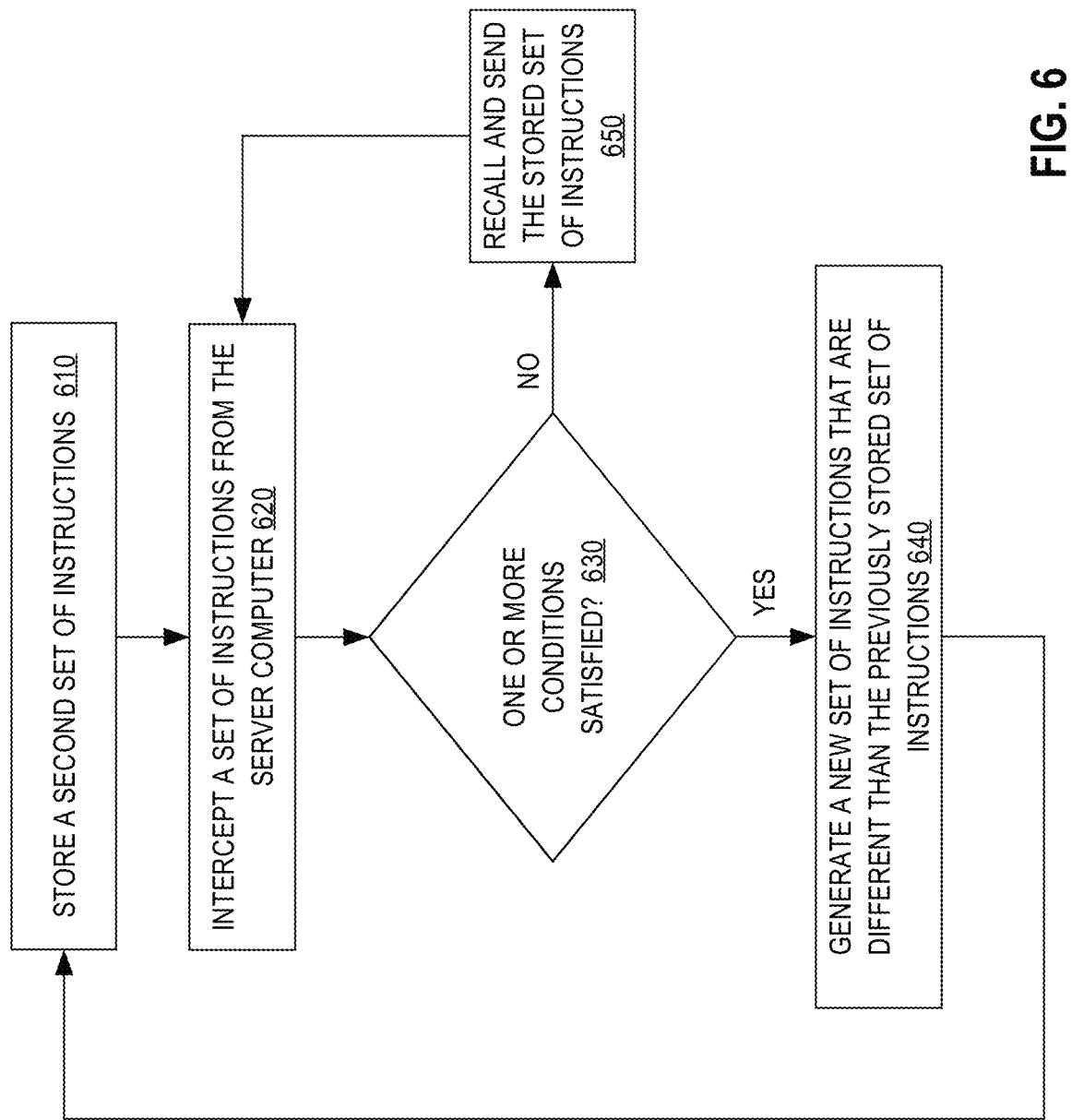
FIG. 6 illustrates a process for storing and refreshing rendered instructions in response receiving the same original instructions from a web server, in an example embodiment.

FIG. 6 illustrates a process for storing and refreshing rendered instructions in response receiving the same original instructions from a web server, in an example embodiment. For purposes of illustrating a clear example, FIG. 6 may be described with reference to FIG. 2 and FIG. 3, but using the particular arrangements illustrated in FIG. 2 and/or FIG. 3 is not required in other embodiments.

Turning now to step 610, in FIG. 6, subsequent to rendering a set of instructions in response to intercepting an original set of instructions, the intermediary computer may store the set of instructions. Additionally, the intermediary computer may store a timestamp. For example, forward translator 336 may store a set of rendered instructions and a timestamp in data storage 240. Additionally, intermediary computer 230, or a component of therein, may store a key associated with the stored, rendered set of instructions. The key may be based on the original set of instructions received. For example, the key may be based on a hashing algorithm using the original set of instructions as a parameter. Also for example, the original set of instructions may include the key.

In step 620, the intermediary computer intercepts a set of instructions from the server computer and determines that the cached, rendered set of instructions is based on the newly intercepted instructions. For example, browser backend 334 may generate a new key based on the newly intercepted instruction. Browser backend 334 may search the stored keys for a matching key. For purposes of illustrating a clear example, assume that browser backend 334 finds a matching key stored from step 610.

In step 630, the intermediary computer determines whether one or more conditions trigger a new set of instructions to be rendered. For example, the intermediary computer may determine that the time elapsed since the rendered instructions were stored is greater than a threshold amount. Browser backend 334 may compare a current timestamp, to the timestamp stored in data storage 240 in step 610. In response to determining that the elapsed time is greater than a threshold, control proceeds to step 640; otherwise, control proceeds to step 650. Additionally or alternatively, the intermediary computer may determine that a particular subset of the intercepted instructions changed. In response to determining that the particular subset of the instructions has changed, control may proceed to step 640; otherwise, control may proceed to step 650. The conditions under which intermediary computer 230 may render a new, different set of instructions may be stored in configuration 232.

In step 640, the intermediary computer generates a new set of instructions that is different than the set of instructions previously stored. For example, browser backend 334 and/or forward translator 336 performs step 520 through step 580 and renders a new, different set of instructions. Control then returns to step 610. For example, forward translator 336 may store the new set of rendered instructions and a current timestamp in data storage 240. Browser backend 334 and/or forward translator 336 may associate the stored key with the new stored set of rendered instructions. Forward translator 336 may, but need not, generate a new key.

In step 650, the intermediary computer recalls and sends the stored set of instructions to the intended client computer. For example, browser backend 334 may instruct forward translator 336 to send the previously stored set of rendered instructions to the intended client computer: visitor browser 295.

Figure 7:
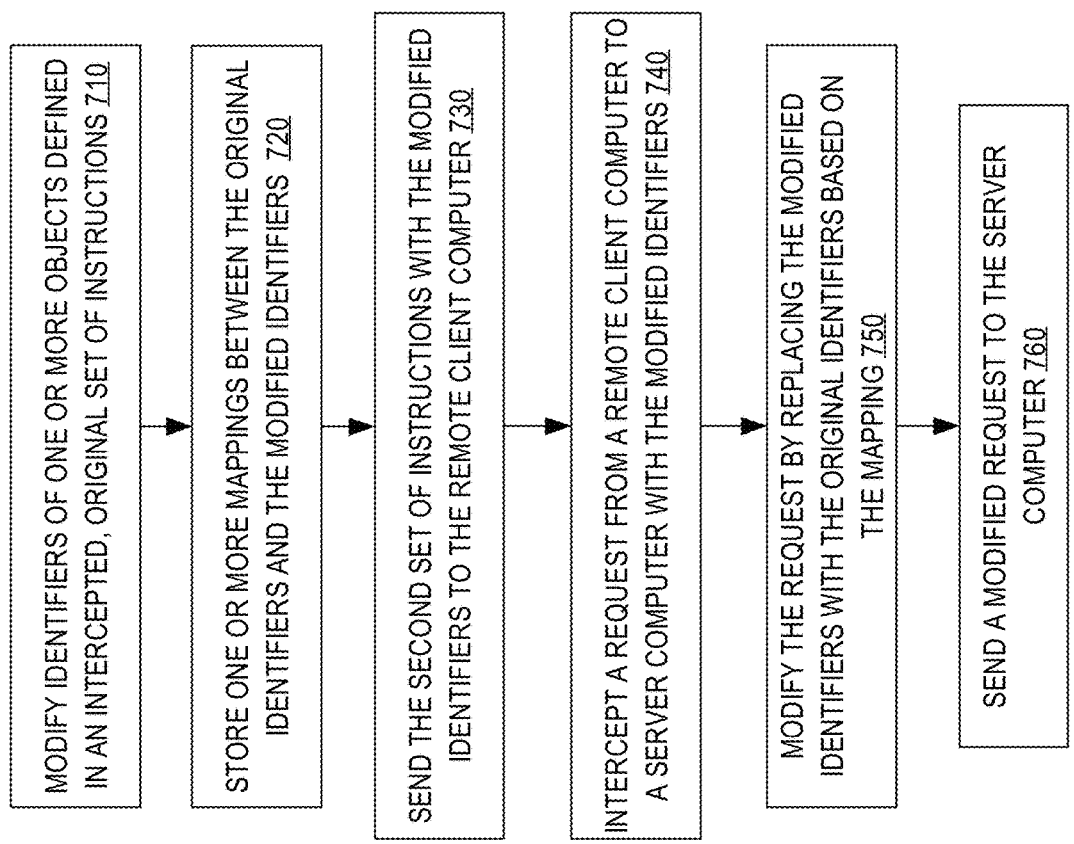
FIG. 7 illustrates a process for intercepting and modifying a request based on one or more stored attribute maps and/or DOM maps, in an example embodiment.

4.3 Intercept a Request from a Client Computer and Translate the Request into a New Request Based on a Stored Mapping Intermediary computer 230 may intercept and modify requests from a client computer based on one or more stored attribute maps and/or DOM maps. FIG. 7 illustrates a process for intercepting and modifying a request based on one or more stored attribute maps and/or DOM maps, in an example embodiment. For purposes of illustrating a clear example, FIG. 7 may be described with reference to FIG. 2 and/or FIG. 3, but using the particular arrangements illustrated in FIG. 2 and/or FIG. 3 are not required in other embodiments. Turning now to step 710, in FIG. 7, an intermediary computer modifies identifiers of one or more objects defined in an intercepted, original set of instructions. For purposes of illustrating a clear example, assume that intermediary computer 230 intercepted an original set of instructions from original web server computer 302 to be sent to visitor browser 195; browser backend 334 generated in-memory data structures 400 based on the original set of instructions; object 452 has an attribute that is a unique identifier: "452"; and forward translator 336 translates an identifier of object 452 identifier to "ABC".

In step 720, the intermediary computer stores one or more mappings between the original identifiers and the modified identifiers. Additionally or alternatively, forward translator 336 may store a transaction identifier. Forward translator 336 may associate the transaction identifier with each mapping. The transaction identifier may be used to recall the mappings associated with the set of original instructions and/or a rendered set of instructions. The transaction identifier may be a modified identifier, such as the identifier of a form object in DOM 450. For purposes of illustrating a clear example, assume that forward translator 336 stores a mapping between "452" and "ABC", in transaction store 340 and/or data storage 240 and that forward translator 336 generates a transaction identifier, "T1", and associates the transaction identifier "T1" with the mapping between "452" and "ABC".

Accordingly, forward translator 336 may send the mapping between "452" and "ABC" and the transaction identifier, "T1", to transaction store 340. Additionally or alternatively, forward translator 336 and/or transaction store 340 may store the mapping and the transaction identifier in data storage 240.

In step 730, the intermediary computer sends the second set of instructions with the modified identifiers to the remote client computer. For purposes of illustrating a clear example, assume forward translator 336 renders a second set of instructions based on the current state of the data structures and the operations, using one or more of the methods discussed herein. Accordingly, forward translator 336 may send the rendered, second set of instructions to visitor browser 295 through protocol handler 338.

In step 740, the intermediary computer intercepts a request from a remote client computer to a server computer with the modified identifiers. For purposes of illustrating a clear example, assume the following: Visitor browser 295 receives the rendered, second set of instructions; visitor browser 295 executes the rendered, second set of instructions and generates the same objects in memory as were stored in in-memory data structures 400 to render the second set of instructions; visitor browser 295 generates a user interface based on the objects in memory; a user using visitor browser 295, enters data into a field with an identifier, ABC, and selects a "submit" button, through the user interface generated from the rendered, second set of instructions; and visitor browser 295 sends a request to original web server computer 302 with the identifier "ABC", data associated with "ABC", and the identifier "T1".

Accordingly, intermediary computer 230 may intercept the request. For example, protocol handler 338 may receive the request. Protocol handler 338 may send the request to transaction store 340.

Additionally or alternatively, if a request is received for which there is no stored attribute maps and/or DOM maps, then the intermediary computer 230 may determine that the request is not an authorized request to be sent to original web server computer 302. Accordingly, the intermediary computer may not forward the request to original web server computer 302 for which the request was intended. Additionally or alternatively, intermediary computer 230 may return an error code, such as HTTP error 500, to the client computer that made the request. Additionally or alternatively, intermediary computer 230 may return a success code, such as HTTP error 200, to the client computer that made the request.

In step 750, the intermediary computer modifies the request by replacing the modified identifiers with the original identifiers based on the mapping. For example, based on the identifier "T1", transaction store 340 may recall the mapping between "452" and "ABC". Transaction store 340 may send the request and the mapping between "452" and "ABC" to reverse translator 342. Reverse translator 342 may modify the request based on the mapping: reverse translator 342 may associate the data associated with identifier "ABC" in the request, with identifier "452" defined in the original set of instructions. Additionally or alternatively, reverse translator 342 may modify the request causing a response to the modified request from original web server computer 302 to be sent to and intercepted by intermediary computer 320, instead of visitor browser 295.

In step 760, the intermediary computer sends a modified request to the server computer. For example, reverse translator 342 may send the modified request to original web server computer 302 through protocol client 332. Original web server computer 302 may send a set of instructions in response to the received request to visitor browser 295, which in turn may be intercepted by intermediary computer 230.

4.4 Methods for an Http-based System

Figure 8:
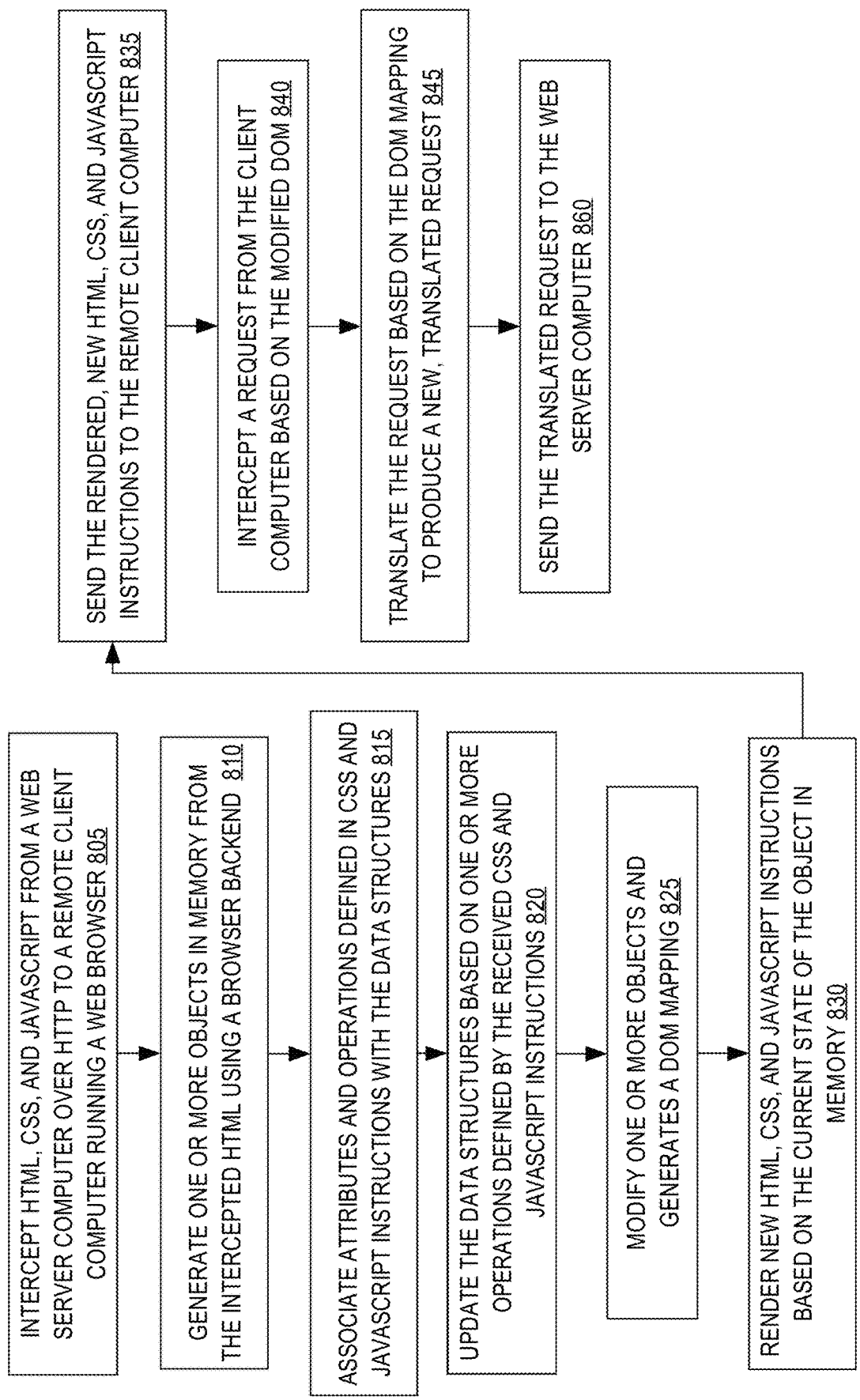
FIG. 8 illustrates a process for intercepting instructions and requests between a HyperText Transfer Protocol ("HTTP") server and an HTTP-based web browser over HTTP, in an example embodiment.

The processes and methods discussed herein may be used for any protocol(s) and/or type(s) of instructions. However, to illustrate a clear example of one or more of the methods discussed above, FIG. 8 illustrates a process for intercepting instructions and requests between an HTTP server and an HTTP-based web browser over HTTP, in an example embodiment. For purposes of illustrating a clear example, FIG. 8 may be described with reference to FIG. 2 and/or FIG. 3, but using the particular arrangements illustrated in FIG. 2 and/or FIG. 3 are not required in other embodiments. Turning now to step 805, in FIG. 8, an intermediary computer intercepts HTML, CSS, and JavaScript from a web server computer over HTTP to a remote client computer running a web browser. For purposes of illustrating a clear example, assume the following:

Original web server computer 302 hosts a website that sends and receives content through HTTP.

Visitor computer 299 is a remote client computer that executes visitor browser 295, which a web browser, that receives and processes HTML, CSS, and/or JavaScript instructions, and sends requests, over HTTP.

Visitor browser 295 generates a DOM maintained in memory on visitor computer 299, based on the received HTML, CSS, and/or JavaScript instructions.

Visitor browser causes a user interface to be displayed on a monitor connected to visitor computer 299 based on the DOM maintained in memory on visitor computer 299.

Intermediary computer 230 is an in-line computer between original web server computer 302 and visitor computer 299, such that all data sent and/or received between original web server computer 302 and visitor computer 299 is sent and/or received through intermediary computer 230.

Protocol client 332 is an HTTP protocol client.

Protocol handler 338 is an HTTP protocol handler.

In response to a request for data from a user, through visitor browser 295, original web server computer 302 sends a first set of instructions comprising HTML, CSS, and JavaScript instructions.

The HTML instructions comprise the following text: <form id="452"><input type="text" id="454" name="454"/></form>.

The CSS instructions comprise the following text: #452{width: 52 px;}.

The JavaScript instructions comprise a first function that references the object with an identifier attribute of "454" and sets the value of the object to a key "12345".

The JavaScript instructions comprise an instruction that causes the first function to be executed after each of the objects defined in the HTML have been loaded, regardless of user interaction.

The JavaScript instructions comprise a second function that submits the value of the field identified as "454" to original web server computer 302.

Accordingly, intermediary computer 230, through protocol client 332 may receive the HTML, CSS, and JavaScript instructions intended to be sent to visitor computer 299. Protocol client 332 may send the HTML, CSS, and JavaScript instructions to browser backend 334.

In step 810, the intermediary computer generates one or more objects in memory from the intercepted HTML using a browser backend. For purposes of illustrating a clear example, assume browser backend 334 is a headless, HTTP, web browser backend that process HTML, CSS, and/or JavaScript instructions and generates objects in memory based on the HTML, CSS, and JavaScript instructions received. Accordingly, browser backend 334 may generate object 452, which represents a form with the identifier "452" in DOM 450 stored in in-memory data structures 400, from the received HTML instructions. Furthermore, browser backend 334 may generate object 454, which represents an input with the identifier "454" which is a child of object 452, in DOM 450, in-memory data structures 400 from the received HTML.

In step 815, the intermediary computer associates attributes and operations defined in CSS and JavaScript instructions with the data structures. For example, browser backend 334 may generate other property information 430, which comprises an attribute named "width", with a value "52 px". Browser backend 334 may associate the attribute named "width" with object 452. Also for example, browser backend 334 may generate JavaScript engine state info 440 which comprises a representation of the first operation and a representation of the second operation. Browser backend 334 may associate first operation and the second operation with object 454.

In step 820, the intermediary computer updates the data structures based on one or more operations defined by the received CSS and JavaScript instructions. For example, browser backend 334 may store the attribute named "width", and the attribute's value, in object 452. Also for example, browser backend 334 may perform the first operation represented in JavaScript engine state info 440. Accordingly, object 454 may include the value "12345". Since no instruction indicates that the second operation should be executed after the objects defined in the HTML are loaded, browser backend 334 need not perform the second operation.

Since the CSS attribute name "width" has already been integrated into the associated object, the attribute may be deleted from other property information 430. Similarly, since the first operation has already been performed, the representation of the first operation in JavaScript engine state info may be deleted. However, for purposes of illustrating a clear example, assume that attribute named "width" and the first operation have not been deleted.

In step 825, the intermediary computer modifies one or more objects and generates a DOM mapping. For example, forward translator 336 may modify the identifier for object 452 to "ABC" and the identifier for object 454 to "DEF" to produce a modified DOM. Accordingly, forward translator 336 may generate a mapping from the original DOM to the modified DOM to produce a DOM mapping, which includes two attribute mappings: "452" with "ABC", and "454" with "DEF".

Forward translator 336 may select the new identifier, "ABC", to be the transaction identifier for the DOM mapping. Forward translator 336 may select the identifier "ABC" because it is the identifier of a form; accordingly, forward translator 336 may associate all mappings of identifiers in the form with the transaction identifier "ABC": the mapping of "452" with "ABC" and/or the mapping of "454" with "DEF". Additionally or alternatively, forward translator may generate a transaction identifier for each form and/or link defined in the original and/or modified DOM. Each mapping may be associated with each transaction identifier. Additionally or alternatively, forward translator 336 may select an identifier for any other reason as the transaction identifier. Additionally or alternatively, forward translator 336 may generate a transaction identifier that is not based on any identifier. Forward translator 336 may store the DOM mapping in data storage 240 and/or transaction store 340.

In step 830, the intermediary computer renders new HTML, CSS, and JavaScript instructions based on the current state of the objects in memory. For purposes of illustrating a clear example, assume the following: The rendered HTML comprises the following text: <form id="ABC"><input type="text" id="DEF" name="DEF" value="12345"/></form>; the rendered CSS comprises the following text: #ABC{width: 52 px;}; the rendered JavaScript instructions comprise an operation that submits the value of the field identified as "DEF" to original web server computer 302.

In step 835, the intermediary computer sends the rendered, new HTML, CSS, and JavaScript instructions to the remote client computer. For example, forward translator 336 may send visitor browser 295 the new HTML, CSS, and JavaScript instructions rendered in step 830, through protocol handler 338, over HTTP. Upon executing the new HTML, CSS, and JavaScript instructions, visitor browser 295 may generate the same objects and/or operations in memory as existed in in-memory data structures 400 when the new instructions were rendered with the modified DOM.

In step 840, the intermediary computer intercepts a request from the remote client computer based on the modified DOM. For purposes of illustrating a clear example, assume the following: The user using visitor computer 299 input text into visitor browser 295, which was associated with object DEF in visitor computer's memory; the user using visitor computer 299 selected a submit button, which caused visitor browser to execute the operation defined by the rendered JavaScript instructions, which submits a request that includes the value of the field identified as "DEF", associated with the identifier "DEF"; the submitted request includes that associates the value of the field identified as "DEF" and/or the identifier "DEF" with identifier "ABC".

Accordingly, protocol handler 338 intercepts the request and sends the request to transaction store 340. Transaction store 340 may recall the DOM mapping associated with "ABC" from transaction store 340 and/or data storage 240. Transaction store 340 may send the DOM mapping and the request to reverse translator 342.

In step 845, the intermediary computer translates the request based on the DOM mapping to produce a new, translated request. For example, reverse translator 342 receives the request and the DOM mapping. Reverse translator 342 translates the request into a new request based on the original DOM, using the DOM mapping. Accordingly, the new request may include the value from the received request associated with the identifier "454", instead of identifier "DEF". Additionally, the new request may include data associating the value and/or the identifier "454" with the identifier "452". The new request may be the request visitor browser 295 would have sent in response to the same user input in step 840 had the original instructions, not the modified instructions, been sent to visitor browser 295.

In step 850, the intermediary computer sends the translated request to the web server computer. For example, reverse translator 342 sends the translated, new request to original web server computer 302 through protocol client 332. Accordingly, original web server computer 302 may respond to the new request and respond with HTML, CSS, and/or JavaScript instruction, at which point intermediary computer 230 may revisit step 805.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
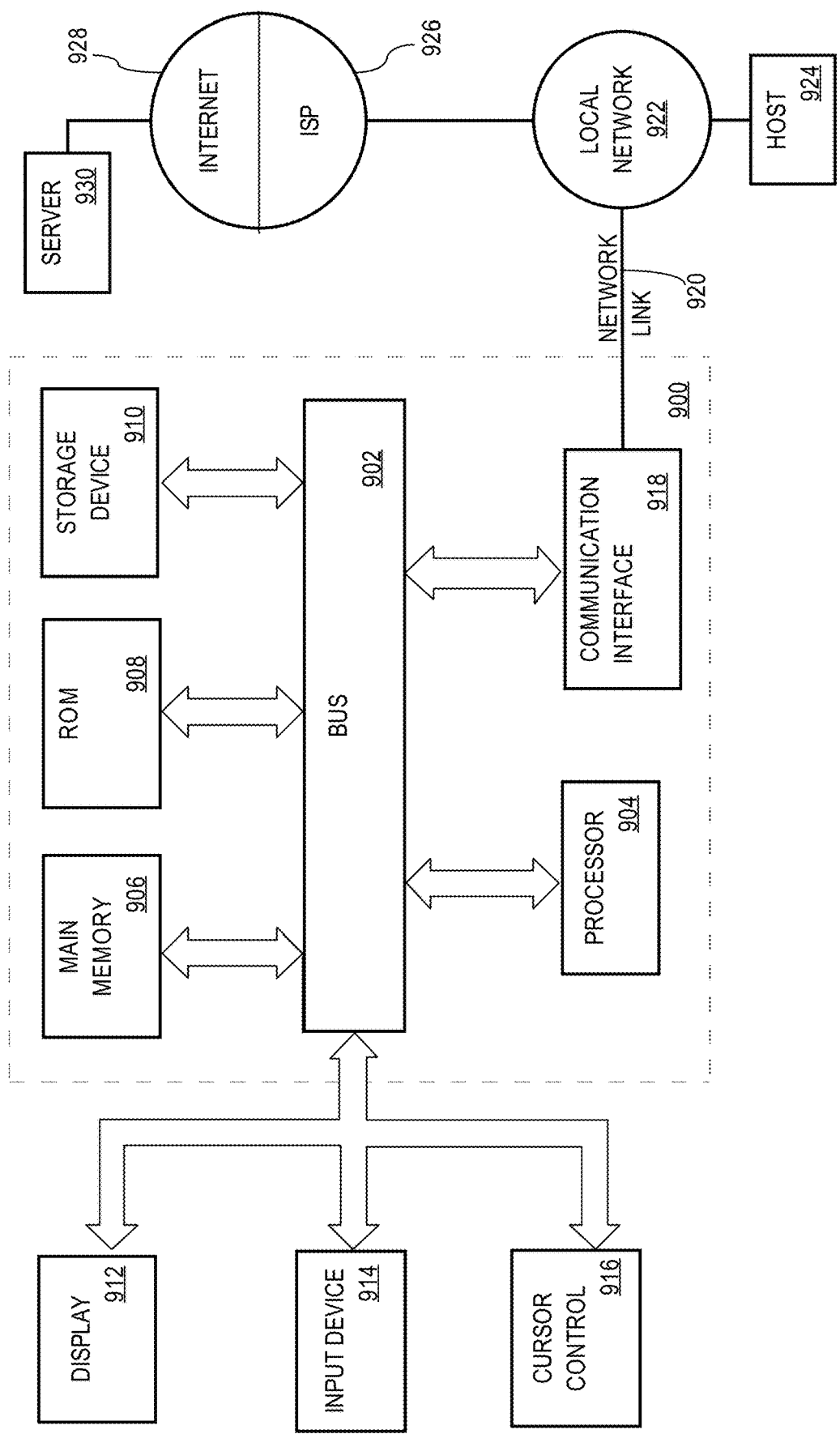
FIG. 9 illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

6.0 Other Aspects of Disclosure

Using the networked computer arrangements, intermediary computer, and/or processing methods described herein, security in client-server data processing may be significantly increased. In particular, the use of browser programs becomes significantly more secure. Forward translating and reverse translating techniques herein effectively permit obfuscating data field and/or container identifiers and DOM modification for data that is financial, personal, or otherwise sensitive so that attackers cannot determine which fields and/or containers in a web page include the sensitive data. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because all fields and/or containers appear to the attacker to be gibberish, or at least cannot be identified as indicating credit card data, bank account numbers, personally identifying information, confidential data, sensitive data, proprietary data, and/or other data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A network security method implemented by a system comprising an intermediary device, a server device, or a client device, the method comprising:
   generating, in memory, a data structure that corresponds to an object in an original document object model (DOM) defined by a first instruction;
   performing an operation defined in the first instruction on the generated data structure to produce an updated data structure, wherein the first instruction is intercepted from a server following a first request for the first instruction from a remote client;
   generating a second instruction configured to cause the remote client to generate the updated data structure in another memory of the remote client, wherein the second instruction is different than the first instruction and defines a modified DOM that is different than the original DOM, wherein a generated DOM mapping between the modified DOM and the original DOM is stored and wherein a second request intercepted from the remote client is translated based on the stored DOM mapping to generate a translated request based on the original DOM; and
   sending the second instruction to the remote client and the translated second request to a server.

2. The network security method of claim 1, further comprising:
   storing the second instruction in the memory;
   receiving a second request from the remote client for the first instruction;
   determining an amount of time that elapsed since sending the second instruction to the remote client; and
   retrieving the second instruction from the memory and sending the retrieved second instruction to the remote client in response to the second request, when the determination indicates that the amount of time is less than a threshold amount of time.

3. The network security method of claim 1, further comprising:
   associating the second instruction with a transaction identifier;
   sending the associated transaction identifier to the remote client; and
   validating a second request received from the remote client when the second request includes the transaction identifier.

4. The network security method of claim 1, the object includes an original identifier and the method further comprises:
   incorporating, for the object, the original identifier in the data structure corresponding to the object;
   updating, the original identifier included in the data structure to produce a modified identifier;
   storing, a mapping between the original identifier and the modified identifier; and
   translating a second request comprising the modified identifier received from the client, based on the stored mapping.

5. The network security method of claim 4, wherein the operation references the object by the original identifier and the method further comprises:
   determining when the operation is associated with the object;
   modifying the operation to produce a modified operation that references the object by the modified identifier, when the determination indicates that the operation is associated with the object; and
   generating an additional instruction which is configured to perform the modified operation, wherein the additional instruction is included in the second instruction.

6. An intermediary device, comprising memory comprising programmed instructions stored thereon and a processor configured to execute the stored programmed instructions to:
   generate, in memory, a data structure that corresponds to an object in an original document object model (DOM) defined by a first instruction;
   perform an operation defined in the first instruction on the generated data structure to produce an updated data structure, wherein the first instruction is intercepted from a server following a first request for the first instruction from a remote client;
   generate a second instruction configured to cause the remote client to generate the updated data structure in another memory of the remote client, wherein the second instruction is different than the first instruction and defines a modified DOM that is different than the original DOM, wherein a generated DOM mapping between the modified DOM and the original DOM is stored and wherein a second request intercepted from the remote client is translated based on the stored DOM mapping to generate a translated request based on the original DOM; and
   send the second instruction to the remote client and the translated second request to a server.

7. The intermediary device of claim 6, wherein the processor is configured to execute the stored programmed instructions to:
   store the second instruction in the memory;
   receive a second request from the remote client for the first instruction;

determine an amount of time that elapsed since sending the second instruction to the remote client; and retrieve the second instruction from the memory and sending the retrieved second instruction to the remote client in response to the second request, when the determination indicates that the amount of time is less than a threshold amount of time.

8. The intermediary device of claim 6, wherein the processor is configured to execute the stored programmed instructions to:

associate the second instruction with a transaction identifier;

send the associated transaction identifier to the remote client; and validate a second request received from the remote client when the second request includes the transaction identifier.

9. The intermediary device of claim 6 wherein the object includes an original identifier and the processor is configured to execute the stored programmed instructions to:

incorporate, for the object, the original identifier in the data structure corresponding to the object;

update, the original identifier included in the data structure to produce a modified identifier;

store, a mapping between the original identifier and the modified identifier; and translate a second request comprising the modified identifier received from the client, based on the stored mapping.

10. The intermediary device of claim 9, wherein one of the operation references the object by the original identifier and the processor is are configured to execute the stored programmed instructions to:

determine when the operation is associated with the object;

modify the operation to produce a modified operation that references the object by the modified identifier, when the determination indicates that the operation is associated with the object; and generate an additional instruction which is configured to perform the modified operation, wherein the additional instruction is included in the second instruction.

11. A non-transitory computer readable medium having stored thereon instructions for network security comprising executable code that, when executed by a processor, causes the processor to:

generate, in memory, a data structure that corresponds to an object in an original document object model (DOM) defined by a first instruction;

perform an operation defined in the first instruction on the generated data structure to produce an updated data structure, wherein the first instruction is intercepted from a server following a first request for the first instruction from a remote client;

generate a second instruction configured to cause the remote client to generate the updated data structure in another memory of the remote client, wherein the second instruction is different than the first instruction and defines a modified DOM that is different than the original DOM, wherein a generated DOM mapping between the modified DOM and the original DOM is stored and wherein a second request intercepted from the remote client is translated based on the stored DOM mapping to generate a translated request based on the original DOM; and send the second instruction to the remote client and the translated second request to a server.

12. The non-transitory computer readable medium of claim 11, wherein the executable code, when executed by the processor, further causes the processor to:

store the second instruction in the memory;

receive a second request from the remote client for the first instruction;

determine an amount of time that elapsed since sending the second instruction to the remote client; and retrieve the second instruction from the memory and sending the retrieved second instruction to the remote client in response to the second request, when the determination indicates that the amount of time is less than a threshold amount of time.

13. The non-transitory computer readable medium of claim 11, wherein the executable code, when executed by the processor, further causes the processor to:

associate the second instruction with a transaction identifier;

send the associated transaction identifier to the remote client; and validate a second request received from the remote client when the second request includes the transaction identifier.

14. The non-transitory computer readable medium of claim 11, wherein the object includes an original identifier and the executable code, when executed by the processor, further causes the processor to:

incorporate, for the object, the original identifier in the data structure corresponding to the object;

update, the original identifier included in the data structure to produce a modified identifier;

store, a mapping between the original identifier and the modified identifier; and translate a second request comprising the modified identifier received from the client, based on the stored mapping.

15. The non-transitory computer readable medium of claim 14, wherein the operation references the object by the original identifier and the executable code, when executed by the processor, further causes the processor to:

determine when the operation is associated with the object;

modify the operation to produce a modified operation that references the object by the modified identifier, when the determination indicates that the operation is associated with the object; and generate an additional instruction which is configured to perform the modified operation, wherein the additional instruction is included in the second instruction.

16. A system, comprising one or more intermediary devices, server devices, or client devices with memory comprising programmed instructions stored thereon and a processor configured to execute the stored programmed instructions to:

generate, in memory, a data structure that corresponds to an object in an original document object model (DOM) defined by a first instruction;

perform an operation defined in the first instruction on the generated data structure to produce an updated data structure, wherein the first instruction is intercepted from a server following a first request for the first instruction from a remote client;

generate a second instruction configured to cause the remote client to generate the updated data structure in another memory of the remote client, wherein the second instruction is different than the first instruction and defines a modified DOM that is different than the original DOM, wherein a generated DOM mapping between the modified DOM and the original DOM is stored and wherein a second request intercepted from the remote client is translated based on the stored DOM mapping to generate a translated request based on the original DOM; and send the second instruction to the remote client and the translated second request to a server.

17. The system of claim 16, wherein the processor are further configured to execute the stored programmed instructions to:

store the second instruction in the memory;

receive a second request from the remote client for the first instruction;

determine an amount of time that elapsed since sending the second instruction to the remote client; and retrieve the second instruction from the memory and sending the retrieved second instruction to the remote client in response to the second request, when the determination indicates that the amount of time is less than a threshold amount of time.

18. The system of claim 16, wherein the processor are further configured to execute the stored programmed instructions to:

associate the second instruction with a transaction identifier;

send the associated transaction identifier to the remote client; and validate a second request received from the remote client when the second request includes the transaction identifier.

19. The system of claim 16, wherein the object includes an original identifier and the processor are further configured to execute the stored programmed instructions to:

incorporate, for the object, the original identifier in the data structure corresponding to the object;

update, the original identifier included in the data structure to produce a modified identifier;

store, a mapping between the original identifier and the modified identifier; and translate a second request comprising the modified identifier received from the client, based on the stored mapping.

20. The system of claim 19, wherein the operation references the object by the original identifier and the processor are further configured to execute the stored programmed instructions to:

determine when the operation is associated with the object;

modify the operation to produce a modified operation that references the object by the modified identifier, when the determination indicates that the operation is associated with the object; and generate an additional instruction which is configured to perform the modified operation, wherein the additional instruction is included in the second instruction.

* * * * *